US008365149B2

(12) United States Patent
Frank et al.

(10) Patent No.: US 8,365,149 B2
(45) Date of Patent: Jan. 29, 2013

(54) DEBUGGER FOR A DECLARATIVE EVENT-DRIVEN PROGRAMMING MODEL

(75) Inventors: Joachim H. Frank, Greenwich, CT (US); Wilfred C. Jamison, Raleigh, NC (US); Curtis R. Miles, Stouffville (CA)

(73) Assignee: International Business Machines Corporation, Armonk, NY (US)

( * ) Notice: Subject to any disclaimer, the term of this patent is extended or adjusted under 35 U.S.C. 154(b) by 1194 days.

(21) Appl. No.: 12/040,508

(22) Filed: Feb. 29, 2008

(65) Prior Publication Data

US 2009/0222795 A1 Sep. 3, 2009

(51) Int. Cl.
*G06F 9/44* (2006.01)

(52) U.S. Cl. .......................... 717/125; 717/128; 717/129

(58) Field of Classification Search ........................ None
See application file for complete search history.

(56) References Cited

U.S. PATENT DOCUMENTS

| | | | | |
|---|---|---|---|---|
| 4,819,233 | A * | 4/1989 | Delucia et al. | 717/129 |
| 5,481,717 | A * | 1/1996 | Gaboury | 717/126 |
| 5,546,593 | A | 8/1996 | Kimura et al. | |
| 5,596,752 | A | 1/1997 | Knudsen et al. | |
| 5,721,920 | A | 2/1998 | Mak et al. | |
| 5,878,262 | A * | 3/1999 | Shoumura et al. | 717/164 |
| 5,926,638 | A * | 7/1999 | Inoue | 717/125 |
| 6,131,185 | A * | 10/2000 | Coskun et al. | 717/129 |
| 6,202,199 | B1 * | 3/2001 | Wygodny et al. | 717/125 |
| 6,230,309 | B1 * | 5/2001 | Turner et al. | 717/107 |
| 6,275,976 | B1 * | 8/2001 | Scandura | 717/120 |
| 6,282,701 | B1 * | 8/2001 | Wygodny et al. | 717/125 |
| 6,385,765 | B1 * | 5/2002 | Cleaveland et al. | 717/100 |
| 6,412,106 | B1 * | 6/2002 | Leask et al. | 717/124 |
| 6,658,649 | B1 * | 12/2003 | Bates et al. | 717/124 |
| 6,668,370 | B1 * | 12/2003 | Harmon et al. | 717/125 |
| 6,671,875 | B1 * | 12/2003 | Lindsey et al. | 717/129 |
| 6,779,120 | B1 | 8/2004 | Valente et al. | |
| 7,058,928 | B2 * | 6/2006 | Wygodny et al. | 717/128 |
| 7,089,534 | B2 * | 8/2006 | Hartman et al. | 717/125 |
| 7,216,338 | B2 * | 5/2007 | Barnett et al. | 717/126 |
| 7,340,728 | B2 | 3/2008 | Kutter et al. | |
| 7,356,735 | B2 | 4/2008 | Bennett et al. | |
| 7,401,322 | B1 * | 7/2008 | Shagam et al. | 717/128 |
| 7,418,584 | B1 | 8/2008 | Klaiber et al. | |
| 7,441,235 | B2 * | 10/2008 | Tohdo et al. | 717/129 |
| 7,464,373 | B1 * | 12/2008 | Yunt et al. | 717/125 |
| 7,472,381 | B2 | 12/2008 | Fox et al. | |
| 7,493,606 | B2 * | 2/2009 | Morin | 717/149 |
| 7,640,538 | B2 * | 12/2009 | Bennett et al. | 717/129 |

(Continued)

OTHER PUBLICATIONS

Kim Haase, Java Message Service API Tutorial, SunMicrosystems, Inc., 2002, pp. 1-278.*

(Continued)

*Primary Examiner* — Thuy Dao
*Assistant Examiner* — Zheng Wei
(74) *Attorney, Agent, or Firm* — Marcia L. Doubet

(57) ABSTRACT

A compiler generates code providing an execution sequence, from a declarative event-driven model, for execution by a computer. To assist in debugging the declarative event-driven model, the compiler also generates cross-references that relate steps in the generated code to elements of the declarative source code. The cross-references may be used as input to a debugger, along with the declarative source and the generated code, to assist a user who is stepping through the generated code (for example) in understanding which portion of the declarative source gave rise to the current step in the generated execution sequence.

12 Claims, 17 Drawing Sheets

U.S. PATENT DOCUMENTS

| | | | | |
|---|---|---|---|---|
| 7,647,528 | B2 * | 1/2010 | Yilmaz et al. | 714/38.1 |
| 7,685,607 | B2 | 3/2010 | Frank et al. | |
| 7,685,635 | B2 | 3/2010 | Vega et al. | |
| 7,886,293 | B2 | 2/2011 | Anderson et al. | |
| 7,904,889 | B2 * | 3/2011 | Avitzur et al. | 717/128 |
| 7,970,892 | B2 * | 6/2011 | Sedukhin et al. | 709/224 |
| 7,971,040 | B2 | 6/2011 | Ayrignac et al. | |
| 8,006,233 | B2 * | 8/2011 | Centonze et al. | 717/126 |
| 8,020,153 | B2 * | 9/2011 | Aoshima et al. | 717/126 |
| 8,266,586 | B2 | 9/2012 | Wang | |
| 2002/0087950 | A1 * | 7/2002 | Brodeur et al. | 717/124 |
| 2002/0111965 | A1 | 8/2002 | Kutter | |
| 2002/0138821 | A1 * | 9/2002 | Furman et al. | 717/128 |
| 2003/0149823 | A1 | 8/2003 | Newman et al. | |
| 2003/0159132 | A1 * | 8/2003 | Barnett et al. | 717/124 |
| 2003/0176998 | A1 * | 9/2003 | Walker | 704/9 |
| 2003/0182626 | A1 | 9/2003 | Davidov et al. | |
| 2003/0208351 | A1 * | 11/2003 | Hartman et al. | 703/22 |
| 2004/0060038 | A1 * | 3/2004 | Johnston-Watt et al. | 717/120 |
| 2004/0181781 | A1 * | 9/2004 | Tohdo et al. | 717/124 |
| 2005/0138605 | A1 * | 6/2005 | Yamamoto | 717/135 |
| 2005/0155019 | A1 | 7/2005 | Levine et al. | |
| 2005/0166182 | A1 | 7/2005 | Wang et al. | |
| 2005/0235264 | A1 * | 10/2005 | Hines | 717/124 |
| 2005/0257243 | A1 | 11/2005 | Baker | |
| 2006/0130029 | A1 * | 6/2006 | Morishita et al. | 717/157 |
| 2006/0242627 | A1 * | 10/2006 | Wygodny et al. | 717/128 |
| 2006/0253842 | A1 * | 11/2006 | Pees et al. | 717/129 |
| 2007/0006228 | A1 | 1/2007 | Grobman et al. | |
| 2007/0179823 | A1 | 8/2007 | Bhaskaran et al. | |
| 2007/0220493 | A1 * | 9/2007 | Morizawa | 717/126 |
| 2007/0240125 | A1 * | 10/2007 | Degenhardt et al. | 717/129 |
| 2008/0010597 | A1 * | 1/2008 | Seemann et al. | 715/723 |
| 2008/0034351 | A1 * | 2/2008 | Pugh et al. | 717/128 |
| 2008/0184203 | A1 * | 7/2008 | Yan | 717/126 |
| 2009/0006063 | A1 * | 1/2009 | Sedukhin et al. | 703/13 |
| 2009/0055838 | A1 | 2/2009 | Sedukhin et al. | |
| 2009/0077564 | A1 | 3/2009 | Loeser | |
| 2009/0119493 | A1 | 5/2009 | Venkitachalam et al. | |
| 2009/0217235 | A1 * | 8/2009 | Suenbuel | 717/104 |
| 2009/0222789 | A1 * | 9/2009 | Frank et al. | 717/104 |
| 2009/0222793 | A1 | 9/2009 | Frank et al. | |
| 2009/0222795 | A1 * | 9/2009 | Frank et al. | 717/127 |
| 2010/0211828 | A1 | 8/2010 | Moyer et al. | |
| 2010/0332968 | A1 * | 12/2010 | Squillace | 715/234 |
| 2011/0179151 | A1 * | 7/2011 | Sedukhin et al. | 709/221 |
| 2012/0151484 | A1 | 6/2012 | Frank et al. | |

OTHER PUBLICATIONS

Yang et al., Clairvoyant: A Comprehensive Source-Level Debugger for Wireless Sensor Networks, published 2007 ACM, pp. 189-204.*

Bernard Pope, Declarative Debgging with Buddha, published in 2005 by Springer-Verlag Berlin Heidelberg, pp. 273-308.*

Pothier et al., Scalable Omniscient Debugging, published in 2007 by ACM, pp. 535-551.*

Adi, Asaf et al., "Amit—The Situation Manager", The VLDB Journal—The International Journal on Very Large Data Bases, vol. 13, Issue 2 (May 2004), pp. 177-203.

Adi, Asaf et al., "The Situation Manager Rule Language", presented at RuleML, 2002.

Frank, Jim H., "Jump-start business activity monitoring (BAM), Part 1: Introduction to monitor modeling", http://www-128.ibm.com/developerworks/architecture/library/ar-bam1/, Feb. 27, 2007.

Adams, Greg et al., "IBM WebSphere Developer Technical Journal: A guided tour of WebSphere Integration Developer—Part 1", http://www.ibm.com/developerworks/websphere/techjournal/0602_gregory/0602_gregory.html, Feb. 22, 2006.

Joachim H. Frank et al., U.S. Appl. No. 12/040,461, filed Feb. 29, 2008, Office Action, Jul. 7, 2011, 18 pages.

Joachim H. Frank et al., U.S. Appl. No. 12/040,461, filed Feb. 29, 2008, Office Action Appendices, Jul. 7, 2011, 5 pages.

Joachim H. Frank, et al., U.S. Appl. No. 12/040,461, filed Feb. 29, 2008, Office Action, May 18, 2012, 16 pages.

PCT International Search Report and Written Opinion for application PCT/EP2009/052285, mailed Jun. 2, 2009, 8 pages.

Joachim H. Frank, et al., U.S. Appl. No. 12/040,485, filed Feb. 29, 2008, Office Action, Feb. 24, 2012, 16 pages.

Joachim H. Frank, et al., U.S. Appl. No. 12/040,461, filed Feb. 29, 2008, Office Action, Jan. 25, 2012, 26 pages.

Bai, Lan S., et al., "Archetype-Based Design: Sensor Network Programming for Application Experts, Not Just Programming Experts", ACM, Proceedings of IPSN'09, Apr. 13-16, 2009, San Francisco, CA. pp. 85-96.

Bhatotia, Pramod, et al., "Incoop: MapReduce for Incremental Computations", ACM, SOCC'11, Oct. 27-28, 2011, Cascais, Portugal. 14 pages.

Gasiunas, Vaidas, et al., "EScala: Modular Event-Driven Object Interactions in Scala", ACM, Proceedings of AOSD'11, Mar. 21-25, 2011, Pernambuco, Brazil. pp. 227-240.

Marth, Kevin, "Programming in the MPL-RM Programming Language", Proceedings of 43rd ACM Southeast Conference, Mar. 18-20, 2005, Kennesaw, GA. pp. 2-262-2-268.

Batory, Don, "Program Refactoring, Program Synthesis, and Model-Driven Development", Proceedings of the 16th International Conference on Compiler Constuction (CC'07), 2007, vol. 4420 of LNCS, pp. 156-171.

Hohpe, Gregor, "Developing Software in a Service-Oriented World", published by ThoughtWorks, Inc., 2005. 11 pages.

* cited by examiner

```
<mm:monitor xmlns:cbe="http://www.ibm.com/AC/commonbaseevent1_0_1"
            xmlns:fn="http://www.w3.org/2005/xpath-functions"
            xmlns:mm="http://www.ibm.com/xmlns/prod/websphere/monitoring/6.1.0/mm"
            xmlns:xs="http://www.w3.org/2001/XMLSchema"
            xmlns:xsd="http://www.w3.org/2001/XMLSchema-datatypes"
   displayName.="AggregateCost" id="AggregateCost"
   timestamp="2007-09-26T23:30:06Z"
   targetNamespace="http://www.example.org/cost/aggregator">
  <monitorDetailsModel displayName="CostAggregatorModel" id="MDM">
    <monitoringContext displayName="CostAggregator" id="CostAggregator">
  310 <inboundEvent displayName="costReport" id="costReport"
         multipleCorrelationMatches="raiseException"
  312    noCorrelationMatches="createNewContext"
         oneCorrelationMatch="deliverEvent"
         rootElement="cbe:CommonBaseEvent"
         extensionName="ReportItemCost">
    314 <correlationPredicate expression="costReport/extendedData/orderNumber = orderNum" />
  319 </inboundEvent>
      <metric displayName="orderNum" id="orderNum" type="xsd:string" isPartOfKey="true">
        <map> 321
          <outputValue>
320         <singleValue expression="costReport/extendedData/orderNumber" />
          </outputValue>
        </map>
      </metric>
      <metric displayName="shippingCost" id="shippingCost" type="xsd:decimal">
        <defaultValue>
330       <singleValue expression="29.75"/>
        </defaultValue>
      </metric>
```

FIG. 3
(cont'd)

```
340 ┌<metric displayName="totalCost" id="totalCost" type="xsd:decimal">
    │    <map> 341
    │        <outputValue>
    │            <singleValue expression="if (fn:exists(itemCost)) then itemCost + shippingCost else
    │             shippingCost"/>
    │        </outputValue>
    │    </map>
    └</metric>
350 ┌<metric displayName="itemCost" id="itemCost" type="xsd:decimal">
    │    <map>
    │        <outputValue>
    │            <singleValue expression="itemCost +xs:decimal(costReport/extendedData/cost)" />
    │        </outputValue>
    │    </map>
    │    <defaultValue>
    │        <singleValue expression="0.0"/>.
    │    </defaultValue>
    └</metric>
  </monitoringContext>
 </monitorDetailsModel>
 <dimensionalModel displayName="CostAggregatorModel DMM" id="DMM">
   <cube displayName="CostAggregator Cube" id="CostAggregator_Cube"
        monitoringContext="CostAggregator" />
 </dimensionalModel>
 <eventModel id="EM">
   <import namespace="http://www.ibm.com/AC/commonbaseevent1_0_1"/>
   <import location="ReportItemCost.cbe" />
 </eventModel>
</mm:monitor>
```

```
<ice:ice xmlns="http://www.example.org/cost/aggregator"
    xmlns:cbe="http://www.ibm.com/AC/commonbaseevent1_0_1"
    xmlns:fn="http://www.w3.org/2005/xpath-functions"
    xmlns:ice="http://www.ibm.com/xmlns/prod/websphere/monitoring/6.1.0/ice"
    xmlns:mm="http://www.ibm.com/xmlns/prod/websphere/monitoring/6.1.0/mm"
    xmlns:xs="http://www.w3.org/2001/XMLSchema"
    xmlns:xsd="http://www.w3.org/2001/XMLSchema-datatypes"
    id="AggregateCost_ice" targetNamespace="http://www.example.org/cost/aggregator">
  <ice:onEvent filter="cbe:CommonBaseEvent/@extensionName='ReportItemCost'"
410 rootElement="cbe:CommonBaseEvent">
411  <ice:fanOut correlationPredicate=
       "cbe:CommonBaseEvents/cbe:CommonBaseEvent[1]/cbe:extendedDataElements
412        [@name='orderNumber'][1]/cbe:values[1]/text() = orderNum"     414
       multipleMatches="treatAsError" noMatches="createNewTarget"
       oneMatch="deliverToTarget" targetRootElement="AggregateCost.MDM.CostAggregator">
420 <ice:branch condition="fn:exists(_ice_key)" distance="5"/>
430 <ice:assign target="_ice_key" value="ice:newKey()"/>
440 <ice:assign target="shippingCost" value="29.75"/>
450 <ice:assign target="itemCost" value="0.0"/>.
460 <ice:assign target="totalCost" value="if (fn:exists(itemCost)) then
            itemCost + shippingCost else shippingCost"/>
470 <ice:assign target="orderNum" value=
        "cbe:CommonBaseEvents/cbe:CommonBaseEvent[1]/cbe:extendedDataElements
            [@name='orderNumber'][1]/cbe:values[1]/text()"/>
480 <ice:assign target="itemCost" value="itemCost + xs:decimal
        (cbe:CommonBaseEvents/cbe:CommonBaseEvent[1]/cbe:extendedDataElements
            [@name='cost'][1]/cbe:values[1]/text())"/>
490 <ice:assign target="totalCost" value="if (fn:exists(itemCost)) then
            itemCost + shippingCost else shippingCost"/>
   </ice:fanOut>
  </ice:onEvent>
</ice:ice>
```

```
<m2i:m2i xmlns:m2i=
"http://www.ibm.com/xmlns/prod/websphere/monitoring/6.1.0/m2i"
    iceResource="platform:/resource/HelloIce/AggregateCost.ice" 510
    mmResource="platform:/resource/HelloIce/AggregateCost.mm"> 511
520 <m2i:mmStep iceRefs="AggregateCost.ice#//@ice/@onEvent.0 521
AggregateCost.ice#//@ice/@onEvent.0/@fanOut.0
AggregateCost.ice#//@ice/@onEvent.0/@fanOut.0/@branch.0
AggregateCost.ice#//@ice/@onEvent.0/@fanOut.0/@assign.0
522 AggregateCost.ice#//@ice/@onEvent.0/@fanOut.0/@assign.1
AggregateCost.ice#//@ice/@onEvent.0/@fanOut.0/@assign.2
AggregateCost.ice#//@ice/@onEvent.0/@fanOut.0/@assign.3" mmRef= 530
"AggregateCost.mm#//AggregateCost/MDM/CostAggregator/costReport">
  <m2i:mmStep iceRefs=
"AggregateCost.ice#//@ice/@onEvent.0/@fanOut.0/@assign.4" mmRef= 540
"AggregateCost.mm#//AggregateCost/MDM/CostAggregator/orderNum/@map.0"/>
  <m2i:mmStep iceRefs=
"AggregateCost.ice#//@ice/@onEvent.0/@fanOut.0/@assign.5" mmRef=
"AggregateCost.mm#//AggregateCost/MDM/CostAggregator/itemCost/@map.0"/>
550 <m2i:mmStep iceRefs=
"AggregateCost.ice#//@ice/@onEvent.0/@fanOut.0/@assign.6" mmRef=
"AggregateCost.mm#//AggregateCost/MDM/CostAggregator/totalCost/@map.0"./>
 </m2i:mmStep>
</m2i:m2i>
```

```
<?xml version="1.0" encoding="UTF-8"?>
<xs:schema xmlns:xs="http://www.w3.org/2001/XMLSchema"
  xmlns:xsd="http://www.w3.org/2001/XMLSchema-datatypes"
  xmlns:cbe="http://www.ibm.com/AC/commonbaseevent1_0_1"
  targetNamespace.="http://www.example.org/cost/aggregator"
  xmlns:="http://www.example.org/cost/aggregator" >

  <xs:import namespace="http://www.ibm.com/AC/commonbaseevent1_0_1"
          schemaLocation="CommonBaseEvent.xsd" />

  <xs:element name="AggregateCost.MDM.CostAggregator">
    <xs:complexType.>
        <xs:sequence>
          <!-- "system" -->
          <xs:element name="_ice_key" type="xsd:string" />
          <!-- "metrics" -->
          <xs:element name="orderNum" type="xsd:string" />
          <xs:element name="shippingCost" type="xsd:decimal" />
          <xs:element name="totalCost" type="xsd:decimal" />
          <xs:element name="itemCost" type="xsd:decimal" />
          <!-- "events" -->
          <xs:element name="costReport"
                  type="cbe:CommonBaseEventType" />
      </xs:sequence>
    </xs:complexType>
  </xs:element>

</xs:schema>
```

DEBUGGER FOR A DECLARATIVE EVENT-DRIVEN PROGRAMMING MODEL

CROSS-REFERENCE TO RELATED APPLICATIONS

The present application is related to commonly-assigned U.S. patent application Ser. No. 12/040,485, titled "Virtual Machine and Programming Language for Event Processing" (referred to hereinafter as "the first related application") and to commonly-assigned U.S. patent application Ser. No. 12/040,461, titled "Compiler for a Declarative Event-Driven Programming Model", both of which were filed concurrently herewith and which are hereby incorporated herein as if set forth fully.

BACKGROUND OF THE INVENTION

The present invention relates to computers, and deals more particularly with debuggers used with declarative event-driven programs.

Event-driven application programs often use a declarative programming style. The application program may specify, for example, several different events that might be received during run-time execution of a particular system, and for each such event, how to respond to the event's occurrence.

This programming style is common in environments including, by way of example, business monitoring systems. A business monitoring system is a computer-based system for monitoring processes, devices, or any kind of items, circumstances, or phenomena (referred to equivalently herein as "monitored entities") in the real world that change their state over time and may pertain to a given business (or a plurality of businesses), where a model may be defined for each monitored entity of interest and used to build or configure a computer-based system that receives event notifications and acts on those event notifications (referred to equivalently herein as "events") in specified ways. The model may be referred to as a "monitor model", as it describes the monitoring activities of interest for the monitored entities; more generally, the model may be referred to as an "observation model" (e.g., in a scenario not directed toward monitoring). A monitor model may define a type of object to be instantiated for each kind of monitored entity. The type would be instantiated as the monitored entity comes to life. The instance would subscribe to events that the entity emits, and build state information about the entity. These objects may be referred to as "monitoring contexts", as they provide the context for monitoring the entity and detecting conditions of interest throughout its life cycle; more generally, these objects may be referred to as "observation objects" or "observer objects".

BRIEF SUMMARY OF THE INVENTION

The present invention is directed, in a first aspect, to a compiler for a declarative event-driven model specification. In one embodiment, this comprises compiling the declarative event-driven model specification by providing the declarative event-driven model specification to a compiler and generating, by the compiler from the provided declarative event-driven model specification, an executable file comprising a sequence of execution steps for execution on a computer. This aspect may further comprise generating cross-references that identify, for each of a plurality of elements from the declarative event-driven model specification, at least one of the execution steps in the generated executable file that corresponds to that element from the declarative event-driven model specification. The generated cross-references may be used, in combination with the declarative event-driven model specification and the generated executable file, by a debugger for debugging execution of the declarative event-driven model specification on the computer.

The present invention is directed, in a second aspect, to a debugger for a declarative event-driven model specification. In one embodiment, this comprises: stepping through, in a debugger, an executing compiled program generated from the declarative event-driven model specification and comprising a sequence of execution steps for execution on a computer; accessing, by the debugger during the stepping through, cross-references that relate the executable steps of the executing compiled program to corresponding elements of the declarative event-driven model specification from which the compiled program is generated; and using the accessed cross-references, by the debugger, to identify a particular one of the elements from the declarative event-driven model specification that corresponds to each selected one of the execution steps executed during the stepping through. The identification may comprise visually highlighting the particular one on a user interface. As one alternative, the identification may comprise visually highlighting, on a user interface, visual representations of the particular one of the elements and each corresponding selected one of the execution steps executed during the stepping through. As yet another alternative, the identification may comprise visually highlighting, on a user interface, visual representations of the particular one of the elements and each corresponding selected one of the execution steps that will be executed for that particular one of the elements during the stepping through. The declarative event-driven model specification may define an observer object and may specify how to update a state of the observer object based on occurrence of events reporting state changes. As one alternative, the declarative event-driven model specification may define a monitoring context for a monitored entity and may specify how to update a state of the monitoring context based on occurrence of events reporting state changes of the monitored entity. In this latter case, an embodiment may further comprise creating at least one instance of the monitoring context to provide an execution context for executing the compiled program.

In this second aspect, the stepping through may further comprise receiving, by the debugger, a test event and processing the received test event according to at least one of the execution steps that corresponds to receiving the test event. The test event may be sent to an address of the debugger. As one alternative, the test event may be published to a publish-subscribe infrastructure and subscribed to by the debugger. The stepping through may further comprise communicating, by the debugger, with a run-time environment that is executing the compiled program, and wherein the communicating identifies the each selected one of the execution steps as a currently-executing one of the execution steps from the compiled program during the stepping through.

Embodiments of these and other aspects of the present invention may also, or alternatively, be provided as systems or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIGS. 3-5 provide examples of a monitor model, compiler-generated output file, and compiler-generated cross-references, respectively, according to one aspect of the present invention;

FIG. 15 depicts a sample schema that may be used for describing the structure of a monitoring context on which the sample monitor model of FIG. 3 would operate.

DETAILED DESCRIPTION OF THE INVENTION

Figure 1:
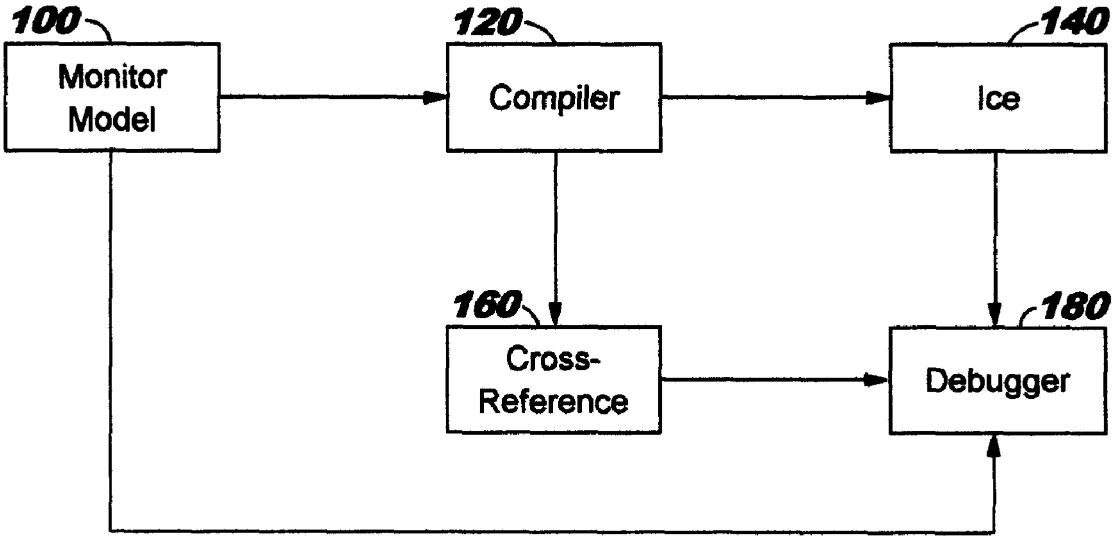
FIG. 1 illustrates a high-level view of processing carried out by aspects of the present invention.

Event-driven application programs are commonly based on a model that specifies the effects of inbound events on receiving objects. Data updates can be modelled using so-called "maps", and conditional effects can be modelled using so-called "triggers". Commonly-assigned U.S. patent application Ser. No. 11/343,145, which is titled "Observation Modeling", describes model-based monitoring and a graphical modeling language that may be used to describe a model. Reference may be made to this commonly-assigned U.S. patent application, which is hereby incorporated herein by reference as if set forth fully, for a detailed discussion of aspects of a typical monitor model or observation model. Note that while "monitoring" is a common application domain for event-driven, declarative programming, this application domain is referenced herein by way of illustration but not of limitation of the environment of the present invention, and techniques disclosed herein may be used with other application domains and with declarative, event-driven programs having a purpose other than monitoring.

A "map", in a monitor model context, is a relationship defined between one or more input elements and one or more output elements. An input element may comprise, for example, a data item in an inbound event or a metric (i.e., a data value). As an example of a metric, in a system that models inventory in a warehouse, a metric may be defined for each inventory item to represent the current on-hand quantity of that item, while another metric may be defined to represent the on-hand quantity at which the item should be restocked and yet another metric may represent the quantity of that item to be ordered when restocking is needed. The first metric would change as items are added to or removed from the warehouse; the last two would be set via human input, for example on a warehouse control dashboard. An output element may comprise, for example, metrics whose values depend on the current values of the input elements. As an example, if the input element is an incoming event that indicates withdrawal of a particular quantity of an item from on-hand inventory, then the output element may comprise a new (lower) value of the on-hand quantity of that item. The model may define a trigger that compares the new on-hand quantity with the restocking limit, and, if restocking is needed, the output of another map, driven by the trigger, may comprise some payload of an outbound event corresponding to placing an order for this item in the restocking quantity indicated in the model.

An inbound event typically carries event content that describes or reports a change in state of a monitored entity. Accordingly, maps may be thought of as specifying what metric(s) should be updated responsive to event content of an inbound event. Using the warehouse inventory scenario, a monitored entity may be the on-hand inventory of a particular widget with a unique identifier "Widget A1B2". An inbound event may indicate that a quantity of 100 of these widgets has been withdrawn from on-hand inventory. This event may be processed by a map that updates the metric reflecting the on-hand inventory for Widget A1B2, reducing its previous value by 100.

A "trigger", in this context, corresponds to detecting when a particular situation defined in the model is occurring. The situation is defined using a set of criteria that may pertain to the monitored entity. An example of a situation for the warehouse inventory scenario is checking to see if an inventory item should be restocked and if so, the trigger may cause the emission of an outbound event that places an order for this item.

Maps are driven when their inputs change, and there can be a number of different causes for evaluating triggers (e.g., when events arrive, when metrics are updated, at certain points in time, and so forth). How such a cause-and-effect model should be translated from a declarative specification into an execution sequence for execution by a computer is not immediately intuitive. To execute such a declarative program in a standard computing environment, the program must generally be translated into a sequence of execution steps. The present invention provides, in one aspect, a compiler for performing this translation. It is generally necessary to execute declarative models on standard computer systems with a so-called "von Neumann architecture" (which systems are well known to those of skill in the art) as well as to debug the compiled programs, for example to verify that they are executing correctly or to determine why they are not executing correctly when some problem is detected. When a declarative program is compiled into a sequence of execution steps, however, it becomes difficult for a human user to relate each executed step back to the element(s) of the declarative program (i.e., the source code) from which it was derived.

Thus, two issues are to be addressed regarding executing the declarative program. First, given that it is desirable to compile the declarative program into a sequential program, a proper execution sequence should be determined. Second, given that it will be necessary to step through the execution of the as-compiled sequential program in order to debug the logic of the original declarative program, a proper level of detail to expose to the user with a debugging interface should be determined, and a way of relating the sequential execution steps back to the original source code of the declarative program is deemed useful. Aspects of the present invention address these issues.

The algorithm to derive the execution sequence according to an aspect of the present invention is discussed below with reference to FIG. 6.

With regard to the level of detail to expose to the user during debugging, it is observed that the instructions in the compiler output should have a "useful" level of granularity. For example, it is not deemed useful to allow the user to step through each operation involved in evaluating an arithmetic expression or each operation involved in persisting a value in a database. Instead, preferred embodiments of the present invention assume that basic operations of this type can be carried out without error. Accordingly, the compiler of preferred embodiments does not generate code for such operations (and the debugger does not provide for stepping through them), but instead such operations are encapsulated in lower-level routines which the compiled code invokes as needed, thus providing an appearance of "atomic" operations to a user attempting to debug a declarative program. This is deemed to not only make debugging less confusing for the user, but is expected to also reduce the complexity of the compiled code (which in turn generally improves the compilation process and the run-time efficiency of the generated code).

This is in contrast to known code generators for monitor models, which might, for example, produce code in the Java® programming language. ("Java" is a registered trademark of Oracle America, Inc. in the United States, other countries, or both.) Such code generators typically generate code containing many steps, such as method invocations, initialization and management of internal variables, exception handling, and so forth that may be considered "uninteresting detail" for a user trying to debug a monitor model. This level of detail makes it difficult for the user to step through the generated Java code.

Furthermore, known code generators do not relate the generated Java code to the original model, except coincidentally through occasional hints (such as method names and variable names that may have been derived from names in the original model, and perhaps some scattered comments) that allow the user to make an educated guess that some portion of the generated Java code is related to some portion of the source code. Accordingly, the user may become confused when trying to determine the source of an error encountered while debugging such code with known debuggers.

By contrast, an aspect of the present invention provides cross-references (e.g., in a cross-reference file or as an in-memory data structure) that relate the steps of the compiled program to elements of the declarative program from which the compiled program is derived. In a preferred embodiment, these cross-references are created by the compiler as it generates the compiled program. The cross-references are used, along with the declarative program and the compiled program, as input to the debugger of a preferred embodiment. (Annotating the generated executable file with cross-references to the model, or annotating the model with cross-references to the executable, is deemed undesirable as introducing extraneous data thereto. Accordingly, preferred embodiments provide the cross-references in a separate file, memory, or other storage.)

Referring now to FIG. 1, a high-level view of processing carried out by aspects of the present invention is illustrated. As shown therein, a monitor model 100 is provided as input to a compiler 120 according to one aspect of the present invention. Compiler 120 generates an "Ice" file 140 and a cross-reference specification 160 (referred to herein also as a "cross-reference file", by way of illustration but not of limitation, or simply as "cross-references") from the monitor model 100. The term "Ice" as used herein refers to the compiled output of the compiler (and is derived from the term "intermediate code"). Besides the monitor model 100, the Ice file 140 and cross-reference specification 160 are used as input to a debugger 180 according to one aspect of the present invention. (The terms "compiled output" and "generated output" are used interchangeably herein when referring to the executable file 140 created by the compiler 120.)

Notably, the notation used in the Ice file (to be described in more detail below) is generated by the compiler, and is not generally intended for writing by a user.

Embodiments of the present invention are preferably used in an application environment described using publish-subscribe communication, where event subscribers receive events from one or more event sources (publishers) and process those events. However, embodiments of the present invention may alternatively be used in an application environment based on a message paradigm, where message producers send messages to particular targets (i.e., message receivers), as long as those messages meet the subscription criteria of an Ice program deployed at a target; these criteria will be discussed in more detail below.

Sending and receiving of events may follow an "event bus" paradigm, whereby inbound events are considered as being received from a bus (which may, for example, be implemented as a queue or other data storage and transmission technology) that connects event sources with event receivers, and whereby outbound events are considered as being delivered to this bus for transmission to interested listeners.

The Extensible Markup Language, or "XML", notation is preferably used to specify the monitor model 100, the Ice file 140, and the cross-reference file 160. Although not shown in FIG. 1, an XML Schema for the monitor model 100 may be provided as an additional input to compiler 120, thereby enabling the compiler 120 to validate the syntactic structure of the monitor model 100 (i.e., the input) during the compilation process. Furthermore, the compiler 120 may also use an XML schema for the Ice file 140 and another schema for cross-reference file 160, where these schema s (also not shown in FIG. 1) specify allowable syntax and structure for the Ice document 140 and cross-reference file 160 and thus can be used to provide a certain level of structural validation of the compiler output.

XML notation is also preferably used to represent inbound events and outbound events, including the content or "payload" of such events.

Figure 2:
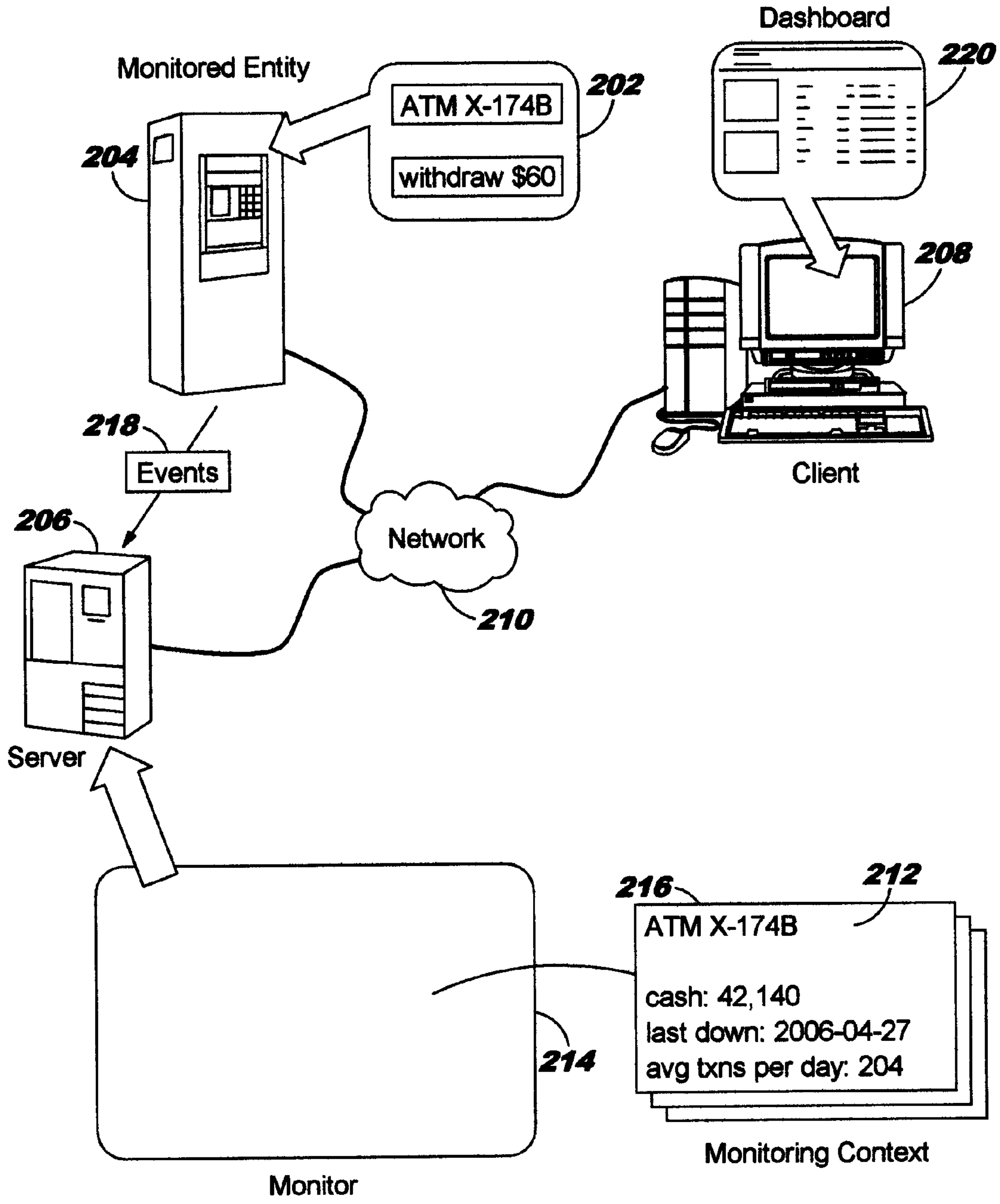
FIG. 2 illustrates components and communication flows therebetween for a sample environment in which an embodiment of the present invention may be used.

Referring now to FIG. 2, components and communication flows therebetween are illustrated for a sample environment in which an embodiment of the present invention may be used. The environment includes a monitored entity 204 (also referred to herein as an event source). A monitor 214 (also referred to herein as a "monitoring application") running on a server 206 monitors the activity of the monitored entity 204. A client 208 provides an interface to view the activity monitored by the monitor 214. The monitored entity 204, monitor 214, and client 208 may communicate via a network 210. The network 210 may be any of various types known to those skilled in the art, such as TCP/IP, Wi-Fi, or token ring.

It should be noted that an environment in which the present invention may be used may include more than one monitored entity 204. In fact, it is contemplated that an arbitrary and possibly large number of monitored entities 204 will exist. (It may also happen that more than one client 208 exists within the environment, although a single client is shown in FIG. 2 for illustrative purposes.)

The monitored entity 204 may be any object in the real world whose state is to be monitored based on events it emits. In the sample environment of FIG. 2, the monitored entity 204 is an automatic teller machine ("ATM"), and permits banking transactions including the withdrawal of funds in the form of cash. Associated with the monitored entity are one or more data values 202 which are modeled as metrics 212. These metrics may include a unique identifier for the monitored entity, such as "X-174B". The metrics may also include measurable information about the state of the monitored entity. For example, the amount of money currently in the ATM is a metric 212; it is measurable and is known to be $42,140 at one moment in time. The value of a metric typically changes over the course of time and is kept up-to-date as the monitoring process is carried out. While logically associated with the monitored entity 204, metrics are created and maintained by the monitoring application 214 running on server 206, and notably, some of these values which are modeled as metrics by the monitoring application 214 may be unknown to the monitored entity 204 itself For example, with regard to the sample metrics 212, an ATM may "know" its current cash level, but it might not maintain knowledge of information such as its last down-time or the average number of transactions it performs per day; monitor 214 can calculate these metrics, in this example, based on events that are emitted by the ATM 204 (and which are specified in the monitor model).

The monitoring application 214 monitors the activity of the monitored entity 204, as noted above, and although a single monitored entity 204 is shown in FIG. 2, a monitoring application 214 may monitor more than one such entity. It should be noted that the monitored entities need not be homogeneous. The monitoring application 214 tracks and represents the current state of the sample environment using the specification from a monitor model (or a plurality of monitor models). According to an aspect of the present invention, the monitoring application 214 comprises executing the compiled version 140 of monitor model 100. During that execution, any monitoring context 216 defined in monitor model 100 may be instantiated and initialized. The monitor 214 may interact with one or more of the resulting instances. Each monitoring context 216 is a virtual representation of a monitored entity 204. Thus, each monitoring context 216 may include one or more metrics describing the current state of the underlying monitored entity 204.

The monitored entity 204 reports a change in its state to the monitor 214 executing on server 206 by transmitting an event 218. This event 218 is received at the monitor 214, which listens for such events, and is associated to a corresponding monitoring context 216. (For example, if multiple ATMs are being monitored, the event 218 specifies an identifier of the particular ATM from which it was generated, and this identifier may be used to locate the monitoring context corresponding to that particular ATM. Refer to the discussion of correlation predicates, below, for more information.) The event 218 specifies sufficient information about the changes to the monitored entity 204 to enable updating the corresponding monitoring context 216. The event may specify an updated value of a metric 212. However, the effects of an event need not be limited to updating a metric, and may be complex. The event may include any data, instruction, or information which conveys the changes in the state of the monitored entity 204 and allows updating the monitoring context 216 to reflect the changes. For example, to represent a withdrawal of $60 from the ATM, an event could specify either that the current amount of cash is $42,080 or that the amount of cash has decreased by $60.

The client 208 offers an interface to visualize the state of the monitored entities as monitored by the monitor 214 executing on server 206. The client 208 may comprise a computer system implementing a so-called "dashboard" interface 220. A dashboard interface is a graphical interface enabling human users to graphically view information such as the state of the monitored entity, as represented by the values of its metrics.

Figure 11:
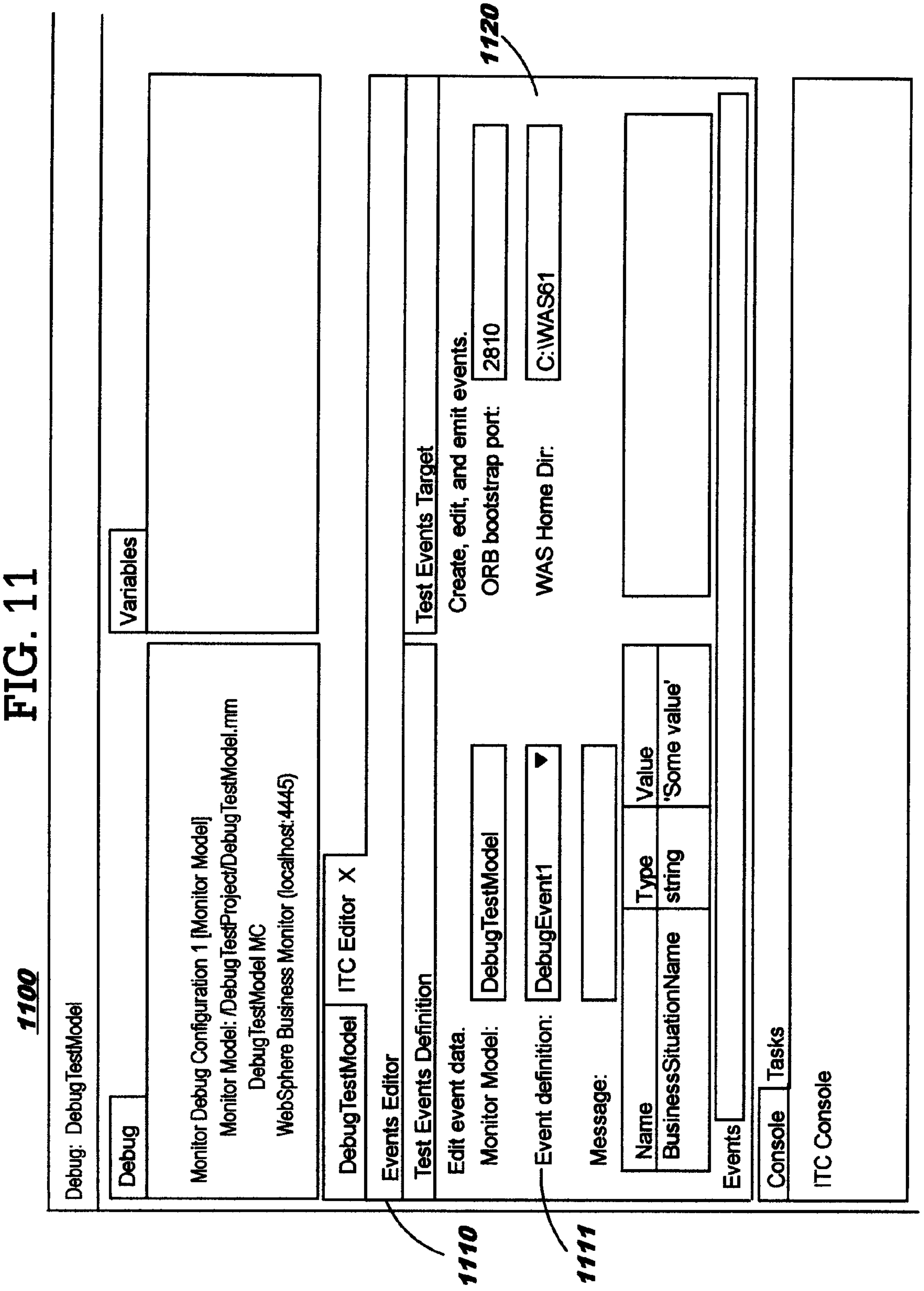

In one approach, the client 208 may also provide a debugger interface with which a user can follow the execution of the compiled version 140 of the monitor model 100 one step at a time. In another approach, the debugger interface is provided from a client which is part of a development tool environment used to define the monitor model. When performing debugging, rather than monitor 214 receiving actual events 218 from monitored entities 204, the user may provide "canned" events (e.g., using test cases, which specify a predefined sequence of test events) to cause traversal of the compiled version of the monitor model or portions thereof. For example, the user may cause an XML encoded event to be sent to a Uniform Resource Locator ("URL") associated with a monitor application which is running in debug, or single-step, mode. (User-selected events are discussed in more detail, below, with reference to FIG. 11.)

FIGS. 3-5 provide examples of a monitor model, compiler output file, and cross-reference file, respectively, according to an embodiment of the present invention. These example files correspond to a simple cost aggregator scenario. Representative elements that may appear in a monitor model (i.e., compiler input) file will now be discussed, after which the example files for the cost aggregator will be discussed.

An <inboundEvent> element defines an event entry point for an instantiated model, and specifies details of the inbound events to be received at this entry point. A nested <filter> element may be used to specify particular criteria which must be met by an incoming event, and events not matching this specification are ignored. A nested <correlationPredicate> element may be used to associate each inbound event that passes the filtering criteria with the appropriate monitoring context(s) in which the event is to be processed. Attributes may be specified pertaining to the correlation predicate, indicating (for example) what action to take if there are no matches, what action to take if there is exactly one match, and what action to take if there are multiple matches.

An <outboundEvent> element defines an event exit point, whereby a specific event is to be emitted. A nested <filter> element may be used to filter out events whose emission should be suppressed.

One or more key values may be used with a monitoring context to enable more than one instance of the context to be instantiated from a particular monitoring context definition. The key values enable distinguishing among the multiple instantiations.

A <metric> element specifies a typed slot for a data value existing in a monitoring context. It may also specify processing instructions for how this value is initialized and updated. Metric update instructions may be specified using maps. The metric may be referenced in other element definitions, indicating the use of its value in evaluating a condition or updating other metrics at run time.

A <counter> element defines a counter to be used in a monitoring context. The counter may be incremented, decremented, set to zero, and referenced in other element definitions.

A <trigger> element serves as an initiator of one or more actions that should occur when particular criteria are met. When these criteria are met within a monitoring context, the trigger is said to "fire". This may impact other triggers, maps, or other entities in the model. In general, the effects of a trigger in a monitoring context can be the same or similar to those of an incoming event. It can thus be considered an "internal event" which is used to signal certain conditions discovered by the monitoring application.

A <stopwatch> element defines a value used in a monitoring context to represent elapsed time. The stopwatch may be started, stopped, reset, and referenced in other element definitions.

A <map> element may be a child of a <metric> or <outboundEvent> element, and defines a map that has one or more input slots and one or more output slots. Each input slot corresponds to a metric or to another type of entity that carries a data value. The output slot of a map also connects to a metric or to another type of entity that can receive one or more data values. The map specifies some algorithm that uses the values in the input slots to compute the output value(s), and writes the output value(s) to the output slot(s). A <map> element may contain <trigger> elements that specify when the map is executed and <assignment> elements that specify how to set a value of an output slot. The monitoring application may ensure that if an input slot of a map changes for any reason, the map is recomputed and the output slot is updated. (The compiler algorithm for generating such cascading updates uses recursion, according to preferred embodiments, as discussed in more detail below with reference to FIG. 6.)

Inbound events cause action(s) to be carried out at the monitoring application. Triggers internal to the model may also spontaneously invoke an action. For example, a <stopwatch> element may be compared with a time limit in a trigger condition; when the time limit is exceeded, the trigger may fire and invoke an action, independently of any external events. Outbound events are populated with values, responsive to actions of the model, and emitted to the event bus (assuming any filtering criteria are met).

Additional and/or different elements and attributes may be supported by an implementation without deviating from the scope of the present invention.

Returning now to the sample cost aggregator of FIGS. 3-5, a cost aggregator, in this example, is a monitor that listens to item cost events or messages. These events carry an order number, an item number, and a cost figure for this item. (See also FIG. 15, which provides a sample schema 1500 that may be used to describe the data structure of a cost aggregator instance.) The events processed by the cost aggregator may report, for example, the usage of an item in filling an order. When the first item cost event with a given order number arrives, a new cost aggregator instance is created and initialized with this order number. The shipping cost for this cost aggregator is set to a default value of $29.75 and its item cost, which will aggregate the cost figures of individual items, is initialized with 0. The item cost reported in the inbound event is then added to the item cost, and a total cost is calculated as the sum of item cost and shipping cost. Subsequent events for the same order will be delivered to the same aggregator, and the initialization phase will be skipped for these subsequent events: only the item cost and total cost values will be updated.

Sample monitor model 300 of FIG. 3 specifies a single kind of inbound event as being of interest to this cost aggregator. See the <inboundEvent> specification at reference number 310. As specified therein, the identifier ("id") for this event is "costReport". The correlator syntax 312 for this event specifies that if after evaluating the correlation predicate for all existing instances, no matching monitoring context is found for an inbound event having the specified rootElement and extensionName, a new context is to be created, but if a single monitoring context matches this event, then the event is to be delivered to that matching monitoring context; on the other hand, if multiple monitoring contexts match this event, then this is an error and an exception is to be raised. The correlationPredicate expression at 314 specifies how to determine whether a monitoring context matches this event, and in this example, the "orderNumber" value from the inbound event is compared to the "orderNum" metric of the currently-active monitoring contexts.

Each instance of this sample cost aggregator has 4 metrics, which are defined at 320, 330, 340, 350. A first metric 320 is "OrderNum". Metric definition 320 specifies that an "orderNumber" value from the extended data section of the "costReport" inbound event 310 is used to set this OrderNum metric. Metric definition 330 pertains to a "shippingCost" metric, and in this example, the metric definition specifies that a default value of $29.75 is assigned to the shippingCost metric at initialization time. Metric definition 340 specifies processing for a "totalCost" metric of the cost aggregator, using a map that specifies conditional logic. As stated therein, if an "itemCost" value exists in the current monitoring context, then this value is added to the shipping cost (i.e., the shippingCost metric) and used to set the totalCost slot or metric in the monitoring context; otherwise, the shipping cost alone is used to set the totalCost metric. Finally, metric definition 350 pertains to the "itemCost" metric. This definition 350 provides a map and a default value specification. The map specifies that the itemCost metric is incremented by a "cost" value from the extended data section of the inbound "costReport" event, and the result is used as an output value for the itemCost slot in the monitoring context. The default value specifies that the itemCost is set to "0.0" at initialization time.

The compiler output file 400 of FIG. 4 is generated, according to one aspect of the present invention, as a sequentially-ordered executable corresponding to the declarative monitor model 300 of FIG. 3. A single <onEvent> element 410 (which uses a namespace prefix of "ice", and is therefore shown in FIG. 4 as <ice:onEvent>) is generated in this example, and corresponds to the single inbound event 310 of FIG. 3. In the general case, an <onEvent> element specifies an inbound event subscription, and may comprise a "filter" attribute and/or a <fanOut> child element. The "filter" attribute captures the filtering criteria (if any) specified for this inbound event in the monitor model. The filter attribute generated for the example model in FIG. 3 will test that the root element of the inbound event is "cbe:CommonBaseEvent", and that it has an attribute "extensionName" whose value is "ReportItemCost". These conditions correspond to the rootElement and extensionName specifications in the <inboundEvent> element 310. A <fanOut> element 411 provides event correlation, encapsulating (in this example) syntax at 412 that corresponds to the correlator syntax at 312 and 314 of FIG. 3, as well as elements 420-490 for all steps pertaining to processing the inbound event for <onEvent> element 410. A <fanOut> element enables a context switch from the current monitoring context (or from no monitoring context at the beginning of processing an event) to one or more target monitoring contexts. The correlator syntax at 412 indicates what action is taken for various matches upon evaluating the correlation predicate for all active monitoring contexts. Syntax at 414 corresponds to the correlation predicate at 314 of FIG. 3, and indicates that the "orderNumber" value from the inbound event is compared to the "orderNum" metric of the active monitoring contexts to determine whether there is a match (or matches). In this example, the compiler has also translated the simplified syntax "costReport/extendedData/orderNumber" of the event field reference in 314 into the actual XPath required to access this field in 414.

A <branch> statement is generated at 420, and tests whether a key value exists already for the matching monitoring context. If so, then the monitoring context is already created and initialized, and the branch statement indicates that control should jump ahead 5 steps (distance="5") at run time. Generating the branch statement to jump ahead 5 steps enables avoiding execution of the initialization steps which are generated at 430-460. Otherwise, if the key value does not yet exist, then the branch is not taken at run time and the next-sequential step 430 is executed. In the general case, a <branch> statement provides a conditional transfer of control to a prior or succeeding step in the program (and a negative value may be used for the distance attribute to transfer control to a prior step).

Several <assign> statements are generated, comprising the syntax at 430-490, and will be referred to equivalently herein as "assignment" statements. In the general case, an <assign> statement specifies an assignment to a slot of the current monitoring context or an outbound event. Assignment statement 430 initializes a key value for the current monitoring context instance, and assignment statement 440 initializes the shippingCost metric in this instance to "29.75". Assignment statement 450 initializes the itemCost metric of this instance to "0.0", and assignment statement 460 carries out the same conditional processing discussed above with reference to syntax specified in the map for metric definition 340 in the monitor model. This completes the sequence of initialization steps, which will be skipped if branch 420 is taken. Assignment statement 470 sets the orderNum metric to the value of the orderNumber from the incoming event, and corresponds to the map in metric definition 320 in the monitor model. Assignment statement 480 computes a value for the itemCost metric, as discussed above for the map in metric definition 350, and assignment statement 490 sets the totalCost metric as discussed above for the map in metric definition 340.

Note that assignment statement 490 is identical to assignment statement 460, in this example. This occurs because the map for the totalCost metric depends on two inputs, namely itemCost and shippingCost. The compiler recognizes that those metrics are set during initialization, and thus generates code at 460 to account for any downstream effects from these initializations. The compiler also recognizes that the itemCost metric is dynamically updated by executing the code at 480, and therefore generates another assignment statement 490 to account for that dynamic update. This illustrates how the compiler of preferred embodiments adds value by translating the declarative logic of the monitor model into the proper sequence of assignment statements, after analyzing the data dependencies.

Several kinds of statements that might be generated by the compiler are not illustrated in the example of FIG. 4. One is an <emit> statement, which is used to specify that an outbound event is to be emitted. Another is a <terminate> statement, used to specify that the current monitoring context should be terminated. Additional and/or different statements may be supported by an implementation without deviating from the scope of the present invention. (Refer also to the first related application for a detailed description of Ice language statements that might be generated by the compiler in a particular implementation.)

As can be seen by comparing compiler output file 400 to the compiler input file, i.e., monitor model 300, the ordering of statements within these related files is quite different, and a user stepping through compiler output file 400 with a conventional debugger is likely to be confused in trying to determine what part of the source code is being executed at a point in time. (Furthermore, it may be even more difficult to determine an error source during normal execution if run-time errors are generated.) Accordingly, an aspect of the present invention provides a cross-reference file as an additional compiler output and uses this file as an additional debugger input (as shown in FIG. 1 and discussed above). A sample version of this cross-reference file is shown at 500 of FIG. 5, and will now be discussed.

File 500 cross-references between the monitor model (compiler input) 300 of FIG. 3 and the compiler output file 400 of FIG. 4. These files 300, 400 are identified as the subject of the cross reference file at 511 (using an mmResource attribute to identify the monitor model) and 510 (using an iceResource attribute to identify the compiler output file). Note that relationships in this cross-reference file may be one-to-many, since a single element in a monitor model may give rise to multiple steps in the compiler output file.

An <mmStep> element is generated in file 500 for each of the operations from the input monitor model (such as executing a map, stopping a stopwatch, incrementing a counter, and so forth). See, for example, <mmStep> element 520. Each <mmStep> element identifies a model element from the source code and the corresponding statement(s) of the compiler output file. The model element defining the operation in the source code is identified, using a variation of the well-known XPath notation, as the value of an mmRef attribute within an <mmStep> element. So, for example, the mmRef attribute at 530 identifies model element 310 of file 300, and the mmRef attribute at 540 identifies the <map> element 321 of file 300. In this manner, the cross-reference file navigates through the elements of the monitor model 300. The Ice statements in file 400 are identified in the cross-reference file, using an XPath-like notation, as the value of an iceRefs attribute. For example, the iceRefs attribute at 521 identifies statement 410, 411, 420, 430, 440, 450, and 460 of the compiler output file 400, all of which were generated to describe the effect of the <inboundEvent> 310 referenced via the mmRef attribute 530, and the iceRefs attribute at 550 identifies the <assign> statement at 490 (i.e., the seventh assignment statement generated within the nesting <fanOut>, identified in FIG. 5 using the ordinal value "6" for zero-based counting).

Note that the syntax identified with reference number 522 comprises a single <mmStep> element. This is because the branch and assignment statements referenced therein all occur as a result of the inbound event subscription defined at 310 of FIG. 3 (which definition continues through reference number 319).

As discussed above, the compiler of preferred embodiments translates a declarative application (such as a monitor model) into a sequence of execution steps, using an intermediate code format (referred to herein as "Ice") that has an appropriate granularity of steps—that is, a granularity similar to the granularity of detail in the declarative program from which it is generated, while not providing uninteresting detail for operations that may be considered atomic. FIG. 6 illustrates a compiler algorithm used by an aspect of the present invention for generating this intermediate code, as will now be discussed in more detail.

The compiler algorithm gets an inbound event definition (event subscription) from the model (Block 600), and Block 605 tests whether such definition was found. If so, an onEvent statement (representing an event subscription, with its filter condition), a fanOut statement (representing the correlation logic), and context initialization statements are generated in Block 610, resulting in logic similar to statements 410-460 in FIG. 4.

Next, preferred embodiments find all downstream effects from the event that happen without intervening trigger control (e.g., all event-driven stopwatch and counter commands, in one embodiment, as well as all direct and indirect updates of metrics). All of these effects can be implemented using assignments of some calculated values to slots in an object representing the execution context (i.e., the monitoring context). Accordingly, Block 615 generates an assignment (or assignments, as appropriate) for each of the event-driven stopwatch commands and each of the counter commands, and Block 620 generates an assignment (or assignments, as appropriate) for each of the direct or indirect updates of metrics. Notably, these assignments are generated respecting dependencies. For example, if a map to metric1 depends on metric2, and both metrics are updated as a result of an incoming event, the assignments are generated to ensure that metric2 is updated before updating metric1. Since cyclic dependencies are forbidden in a monitor model, respecting data dependencies in determining the sequence of assignments will not lead to contradictions (or dead-locks) and generation of these cascading updates will end after a finite number of steps.

In Block 625, code is generated that will fire any outbound events that are currently pending for emission. Next, Block 630 generates code to evaluate any triggers pending for evaluation and fire them if needed. (As discussed earlier, triggers may become pending for evaluation as a result of metric updates, inbound events being received, other triggers firing, etc.) The processing at Block 630 comprises, in preferred embodiments, an invocation of the logic of FIG. 6B. Block 635 then generates code that will terminate any monitoring contexts that are currently pending for termination. (An inbound event definition may contain syntax indicating that receipt of this kind of event represents a termination condition for the receiving monitoring context; any context receiving such an event would then become pending for termination.) Processing then returns from Block 635 to Block 600, where a next one of the event subscriptions is processed in an iterative manner until all inbound event definitions have been processed. Following a negative result for the test at Block 605 (indicating that all of the inbound event definitions have now been processed), the processing in FIG. 6A ends.

Figure 6A:
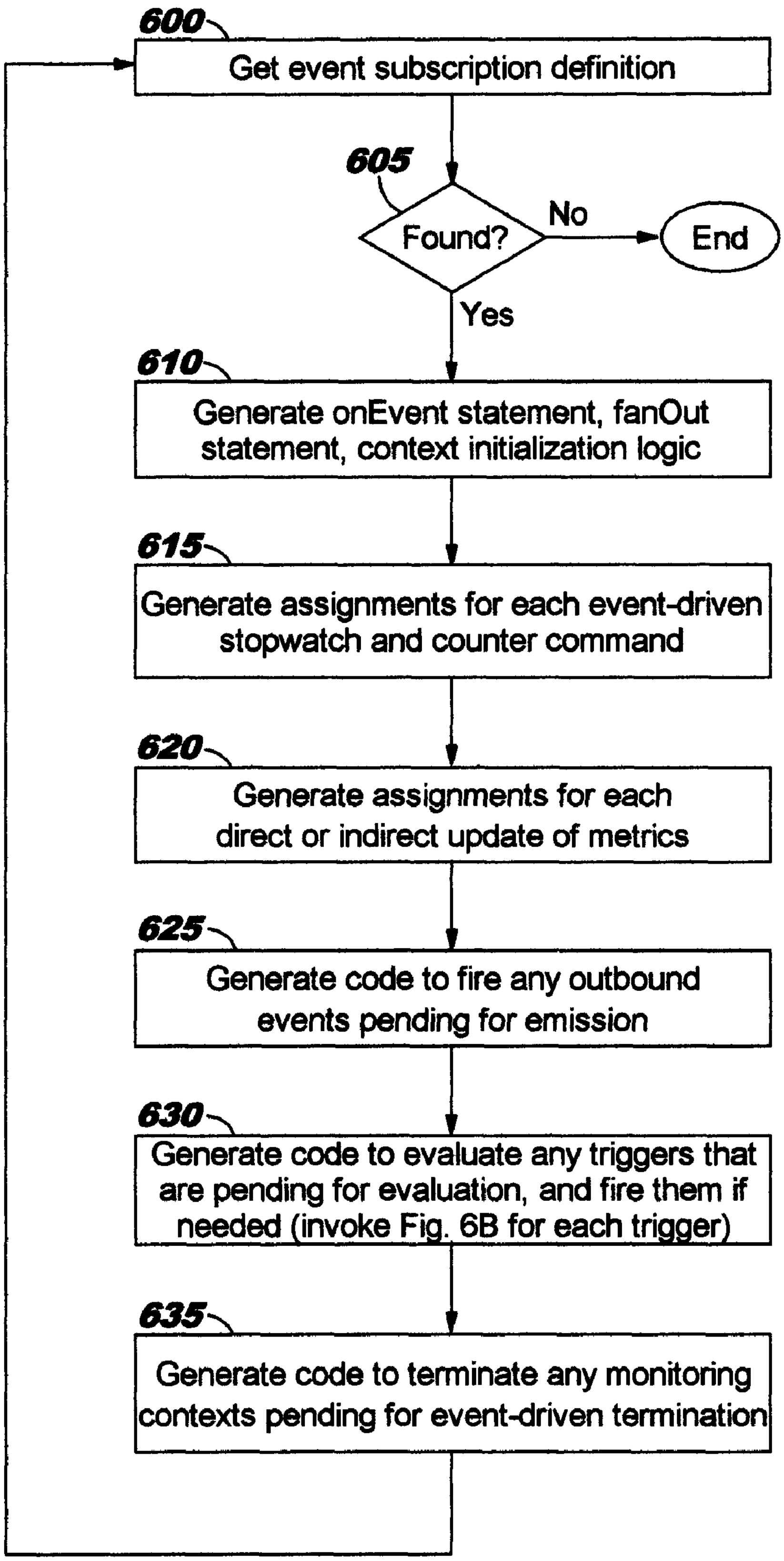
FIG. 6 (comprising FIGS. 6A and 6B) illustrates a compiler algorithm used by an aspect of the present invention.
Figure 6B:
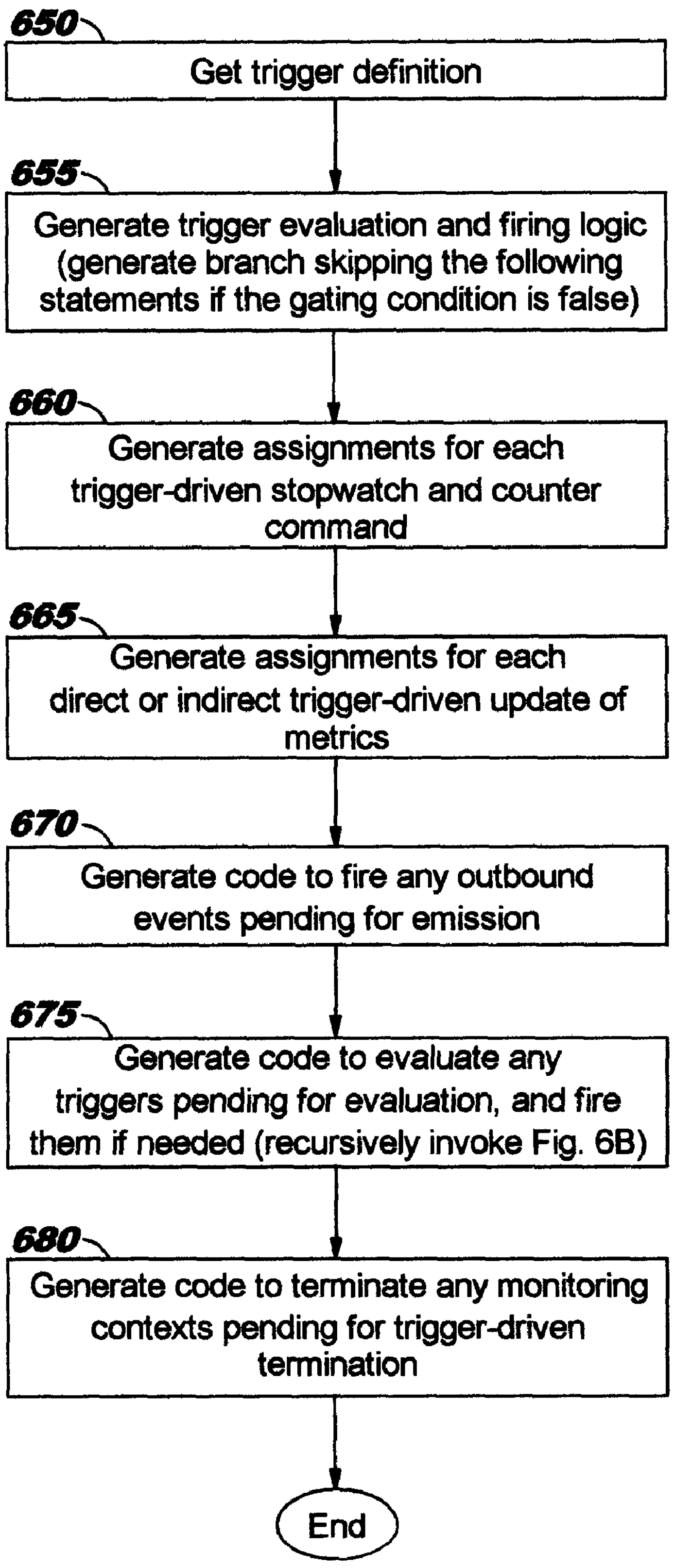

FIG. 6B illustrates processing for triggers, similar to the inbound event processing of FIG. 6A. In Block 650 of FIG. 6B, the compiler algorithm gets the definition of a to-be-evaluated trigger from the model. A branch statement, which tests the trigger's gating condition and skips the subsequent statements if it is false, is generated in Block 655.

Preferred embodiments then find all downstream effects of this trigger, including all trigger-driven stopwatch and counter commands (if such elements are present in the input model) as well as all direct and indirect updates of metrics that may occur as a result of this trigger firing. All of these effects can be implemented using assignments of some calculated values to slots in an object representing the execution context (i.e., the monitoring context). Accordingly, Block 660 generates an assignment (or assignments, as appropriate) for each of the trigger-driven stopwatch commands and each of the counter commands, and Block 665 generates an assignment (or assignments, as appropriate) for each of the direct or indirect updates of metrics. As discussed above with reference to Block 620, the assignments generated at Block 665 are generated respecting dependencies.

In Block 670, code is generated that will fire any outbound events that are currently pending for emission. Block 675 generates code to evaluate any triggers that have become pending for evaluation as a consequence of executing any of the statements generated previously, and fire them if needed, thereby causing the logic in FIG. 6B to be invoked recursively. (This recursion will end because there are only a finite number of trigger definitions and their dependency graph has no cycles.) Finally, Block 680 generates code that will terminate any monitoring contexts that are currently pending for termination.

Note that the run-time order of processing triggers, if several fire at the same time, is undefined. This can be considered a race condition, and a similar race condition occurs if several inbound events are received at the same time. If the result of processing two simultaneously-arriving events according to a particular model depends on the order in which they are processed, then this model is an ill-defined model. Similarly, a model is ill-defined if the result of trigger processing for two simultaneously-firing triggers depends on the order in which their effects are executed. (It may be desirable to detect such issues in a monitor model editor and prompt the user to revise the model accordingly.) As a result, the apparent "arbitrariness" that may occur at Blocks 630 and 675 is natural, and in fact expected, for an event/trigger-driven programming model.

As can be seen by comparing FIGS. 6A and 6B, the generation of the statements representing the trigger's effects in FIG. 6B follows the same logic that is shown in FIG. 6A for inbound events: statements are generated for trigger-driven stopwatch and counter updates, direct and indirect updates of metrics, emission of outbound events, evaluation of further triggers (if such evaluation is caused by the preceding trigger or any updates it engendered), and finally for context termination if warranted.

As has been stated, the compiler—in addition to producing the execution sequence in the Ice output file—may also produce a cross-reference file that relates each step in the generated compiler output with an inbound event subscription, a map, a counter or stopwatch command, a trigger definition, or an outbound event definition from the original monitor model specification. These cross-references may be used by the debugger disclosed herein, as the user executes steps in single-step mode, to highlight the original model constructs from which those steps of the generated compiler output were produced. Accordingly, at each of Blocks 610-635 and 655-680, the compiler preferably writes syntax into a cross-reference file to record relationships between the monitor model input file and the generated compiler output file. This syntax has been illustrated in FIG. 5, and discussed above with reference to this figure as well as FIGS. 3-4. (Note that various "housekeeping"-type syntax is generated by the compiler for the output file illustrated by FIG. 4 and the cross-reference file illustrated by FIG. 5, such as the namespace definition, or "xmlns", statements appearing at the beginning of those files. Such syntax is readily understood by those of ordinary skill in the art, and an explanation thereof is not deemed necessary to an understanding of the present invention.)

Operation of a debugger according to one aspect of the present invention will now be discussed with reference to FIGS. 7-12. Use of this debugger enables a user to interactively understand how the monitor model will execute at run time, and how it will respond to particular inbound events being received. It can also enable the user to understand how a particular inbound event is processed through the filter condition(s) and correlation predicate(s) and then delivered to a monitoring context instance or instances. (The sample views shown in FIGS. 7-12 should be interpreted as providing one way in which information may be displayed for a user, and in which information may be obtained from the user; accordingly, these sample views are provided for purposes of illustration but not of limitation.)

Figure 7:
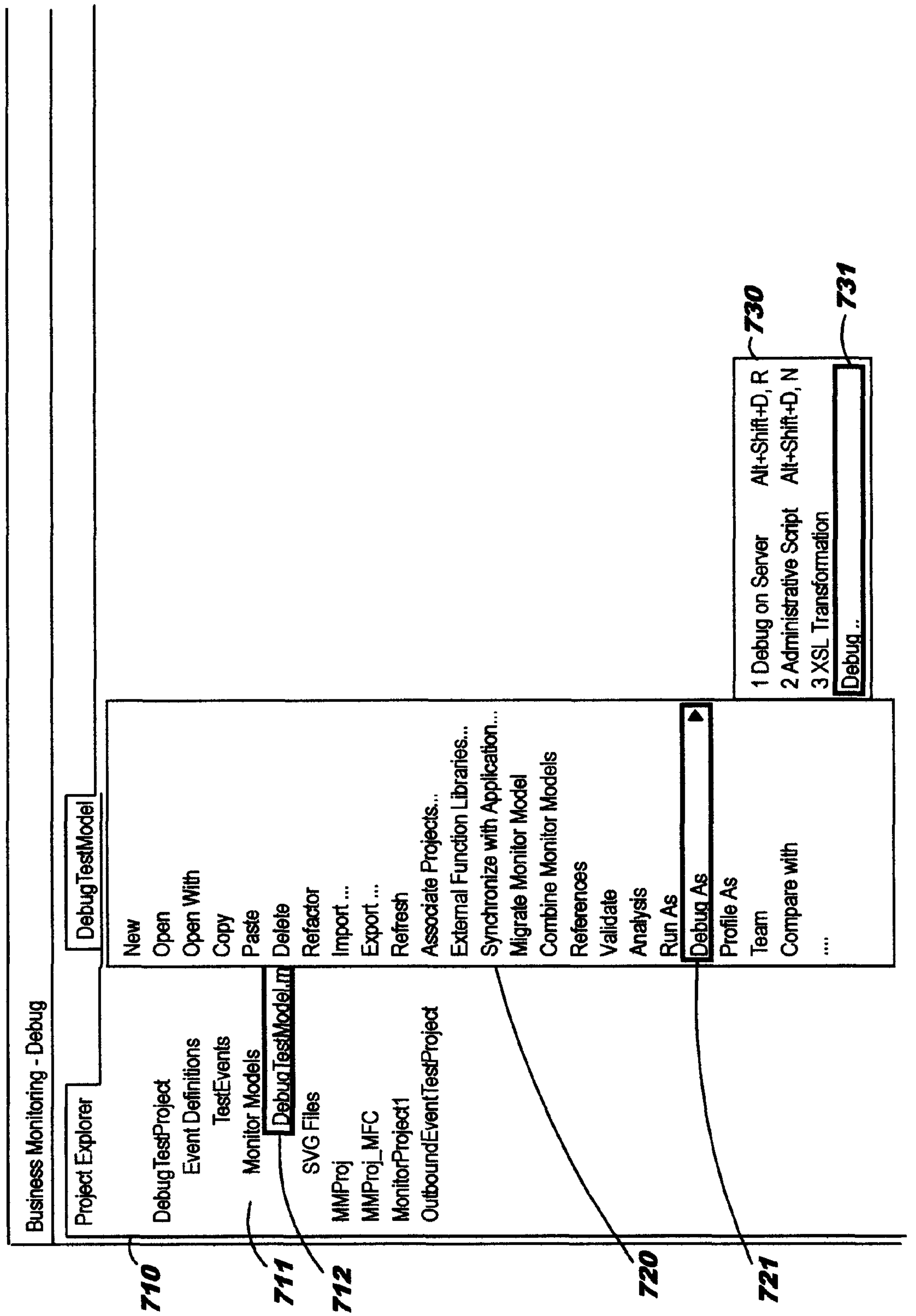
FIGS. 7-12 illustrate operation of a debugger, according to one aspect of the present invention.

FIG. 7 depicts a sample graphical user interface ("GUI") 700 from which a user may launch a debugger. The user may begin by selecting a monitor model named "DebugTestModel.mm" 712. After right-clicking the mouse, a pop-up menu 720 is displayed, showing as a choice therein "Debug As" 721. The user selects this choice 721, and then selects "Debug" 731 from another pop-up menu 730. As will be obvious, other ways of invoking the debugger and selecting a particular monitor model to be debugged may be supported without deviating from the scope of the present invention. As one example, menu item 721 might be replaced by a choice such as "Debug" and pop-up menu 730 might be omitted.

Figure 8:
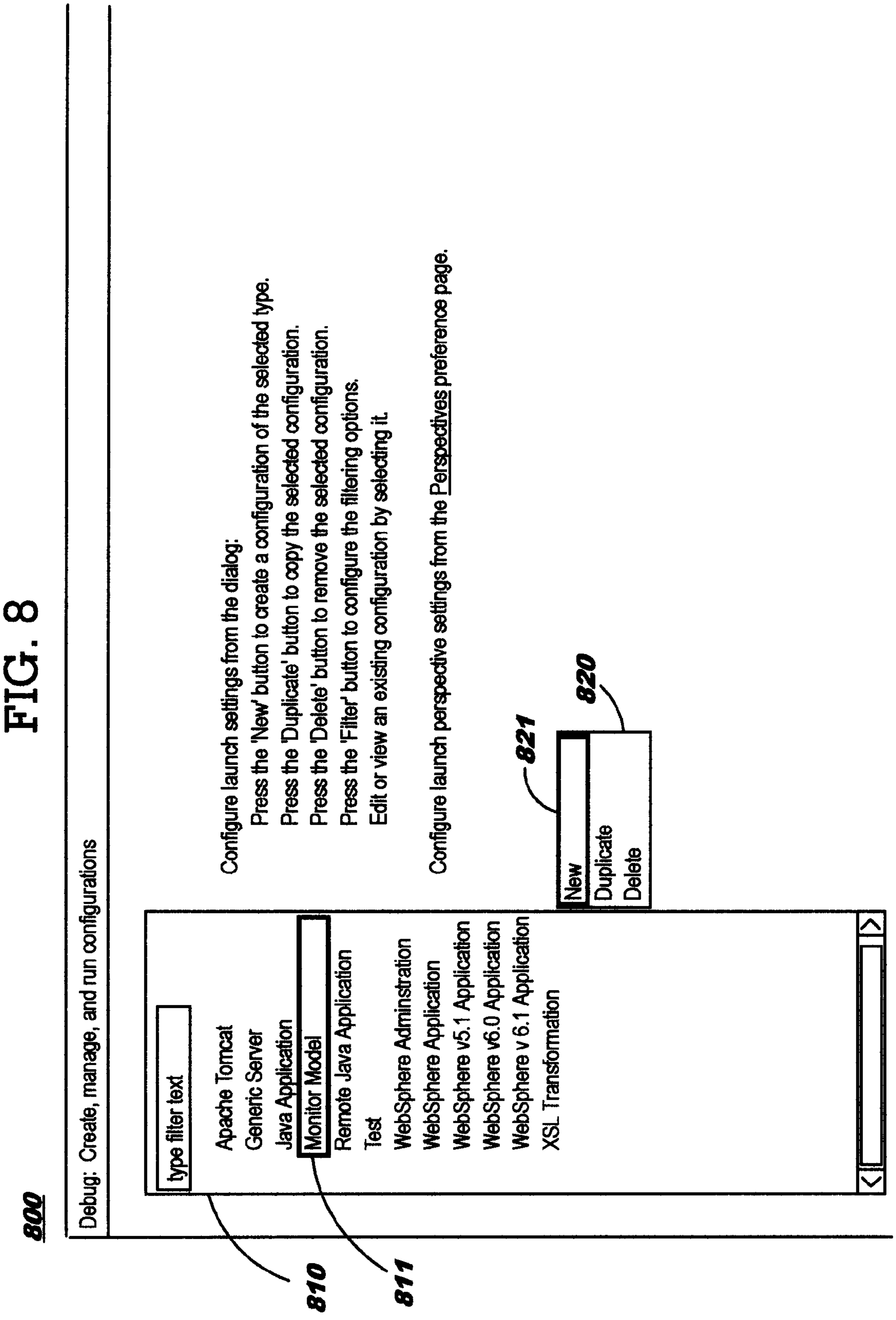

Referring next to FIG. 8, a Debug Configuration dialog is displayed. The user locates the "Monitor Model" configuration type entry 811 in panel 810, and in this example, selects "New" 821 from pop-up menu 820.

Figure 9:
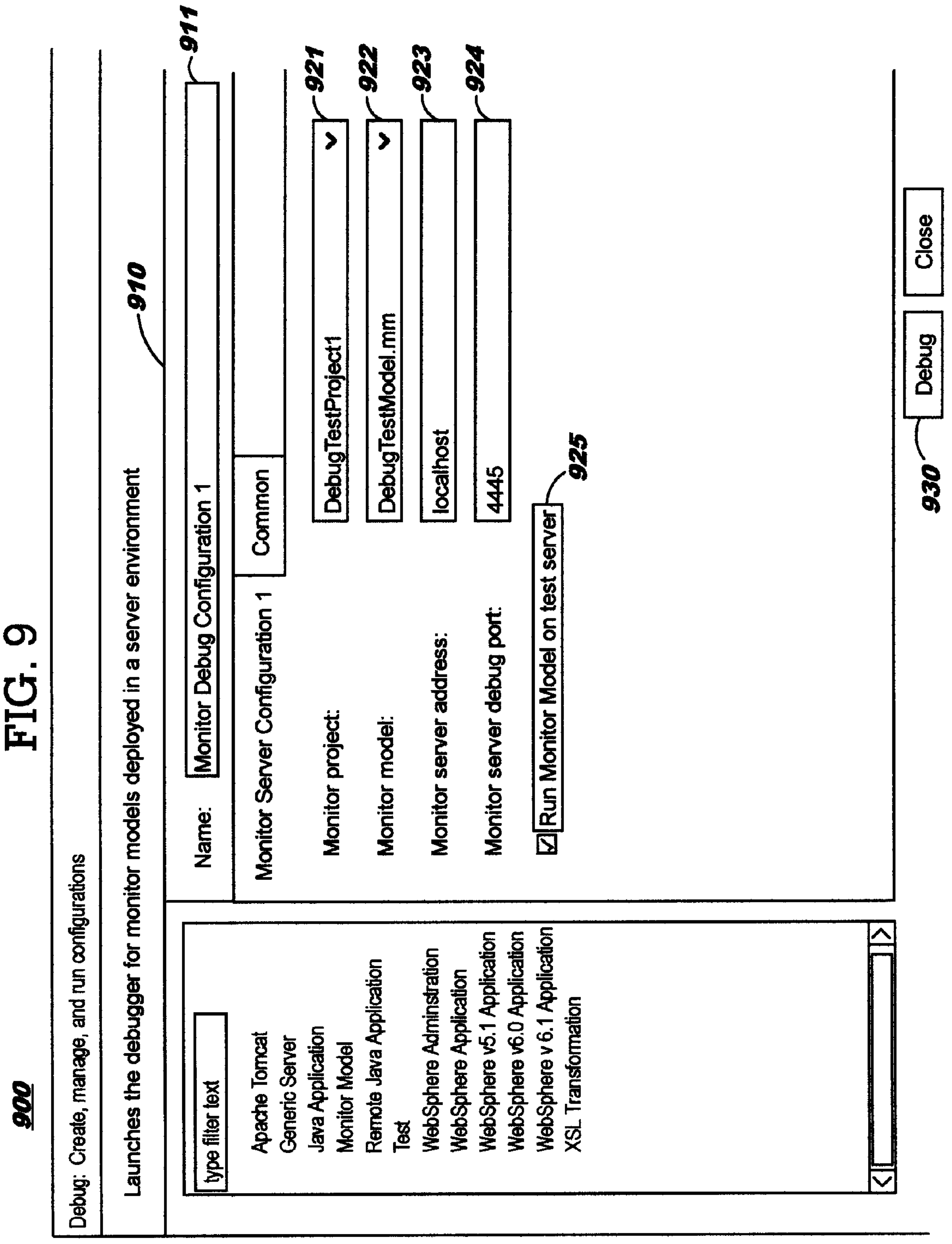

In response to choosing "New" at 821, a new monitor model debug configuration is created. FIG. 9 illustrates a GUI 900 in which configuration information may be entered in panel 910. As shown therein, this sample GUI presents a name 911 of the configuration, a project name 921 with which this debug configuration is associated, and the name 922 of the monitor model to which this configuration applies. The user may specify a server address 923 of a server on which the monitor will execute and a port number 924 to use at that server for communication with the debugging client. Once the user verifies that the information is correct, he presses "Debug" button 930 to begin debugging. In one approach, compilation of the monitor model is delayed until debugging, and accordingly, pressing button 930 causes the selected monitor model 922 to be compiled into the Ice format described above (see FIG. 4) and deployed to a run-time environment for execution.

In one approach, the user selects at 925 to execute the monitor model on a test server. Accordingly, the Ice code is generated and deployed to this server. The Ice representation in conjunction with the cross-reference file is used to display the execution steps in the debugger and relate them back to the source model statements, allowing the user to analyze the flow of execution and its relationship with the original declarative, event-driven program.

Figure 10:
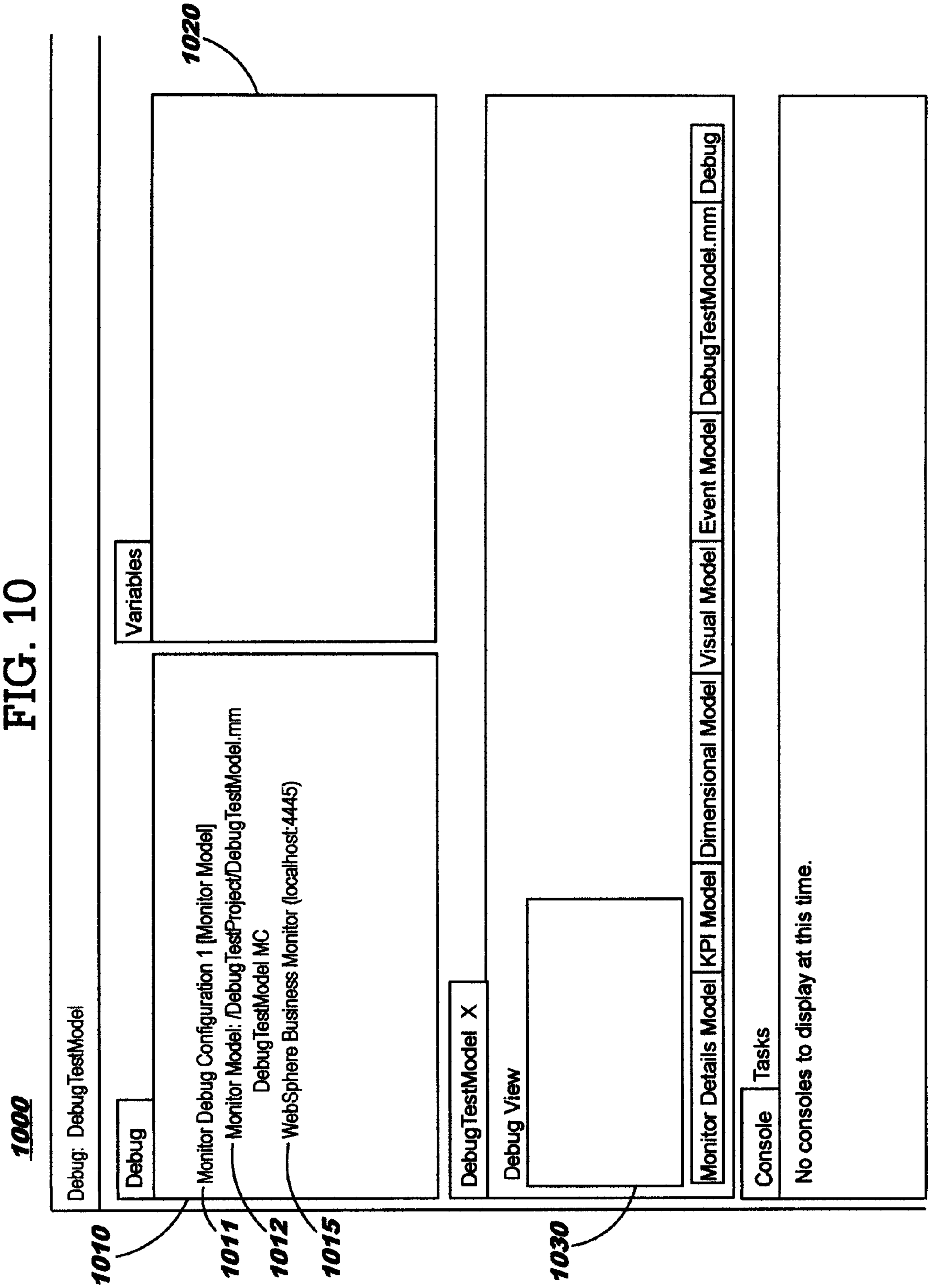

When the model has been deployed for debugging, an embodiment of the present invention provides a view such as GUI 1000 of FIG. 10, which enables the user to understand how the monitor model will execute at run time. In this sample view 1000, a tabbed work area 1010 identifies the monitor model currently being debugged (see reference number 1012), as well as the configuration currently in use for debugging that model (see reference number 1011). In this example, reference number 1015 depicts an identification of the test server where the compiled version of the model will execute. The "Debug View" work area 1030 and "Variables" work area 1020 are shown as empty in FIG. 10 because no events have executed at this point.

The user then uses the debugger client to emit a sample test event to the server on which the monitoring application is now executing. As noted earlier, the user may select from predefined test events for this purpose. The test event is sent out using the event bus and is received by interested listeners, one of which will be the debug server. The test event is received at the debug server and delivered to an appropriate monitoring context of the compiled model. See FIG. 11, which shows an "Events Editor" tabbed work area 1110 of GUI 1100. In this example, a drop-down selection window 1111 enables the user to select from among predefined sample test events, and a "Test Events Target" tabbed work area 1120 allows the user to identify a receiver or destination for the event (i.e., the debug server, for events to be processed by this server).

Preferably, the Ice run-time in which the compiled Ice program executes communicates with the debugger (also referred to herein as a "debug editor") GUI using HTTP requests or a TCP/IP callback port (which may be decided during communication handshaking using known techniques). Socket communication is preferably used to enable bi-directional communication between these entities during debugging. According to preferred embodiments, included in the communication is a description of the current step of execution processing. This may include information such as: all the monitoring context definitions that will need to evaluate one or more inbound event filter conditions to determine if the newly-received event will be processed; which inbound event filter conditions have passed and which have failed; all the monitoring context instances for which the correlation predicate(s) associated with the inbound event definitions whose filters the event has passed evaluated to true; which monitoring context instances receive the inbound event according to the no-/one-/multiple-correlation match settings; and so forth.

Figure 12:
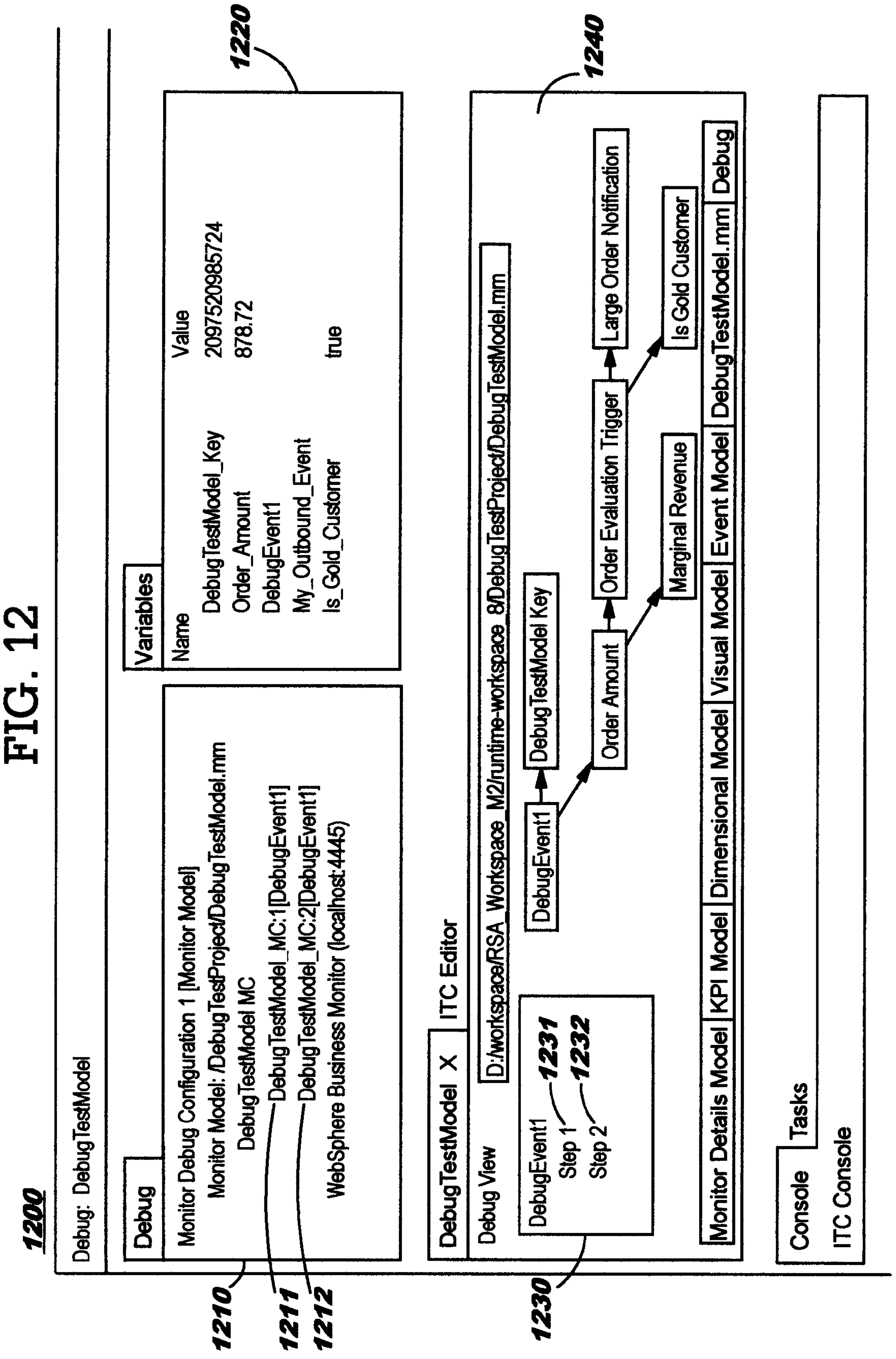

Suppose the user selected an event called "DebugEvent1" from drop-down selection window 1111, and further suppose that this event is received at (i.e., matches) two monitoring context instances. GUI 1200 of FIG. 12 shows the debugger GUI once the inbound event has been delivered to these two monitoring context instances. See 1211, 1212 of work area 1210, where each of the monitoring context instances is identified. Each instance processes the event in turn. Work area 1220 provides a "Variables" view, where the current value for all the metrics in the given monitoring context may be seen.

In one approach, the "Debug" view 1230 of the debug editor shows a tree in window 1240, where this tree indicates all the elements of the declarative model (compiler input) that contribute to the processing of this event on the right, and the sequential execution steps (compiler output) that will run as a result of this inbound event being received on the left. In this example, the steps are identified for ease of reference as "Step1" 1231 and "Step 2" 1232. As the user steps through the processing of a given inbound event, the tree node in window 1230 that corresponds to the currently-executing step of the compiled code, as well as the monitor model element from which it was derived, are preferably visually highlighted. This provides one way in which the cross-references in file 500 may become manifest in the visualization of this approach.

In another approach (not shown in FIG. 12), the tree in window 1230 may be presented as a visual rendering of the cross-reference file, depicting a sequence comprising the model element identified in the mmRef attribute of each <mmStep> element and, at a child level of that model element, the Ice statements identified in the iceRefs attribute of that same <mmStep> element, with a visual highlighting of the Ice statement currently being executed.

The work area 1240 of the debug editor provides a graphical depiction of the interdependencies of elements in the original (i.e., input) model. Optionally, an embodiment of the present invention may display hover help or tooltip text when the user hovers the mouse over a metric in this graphical view. For example, the current value for that metric may be displayed as a tooltip responsive to the hovering. Clicking an element in the diagram in work area 1240 preferably causes the corresponding element in the Variables view 1220 to be displayed so that the user can investigate the metric value. Optionally, an embodiment of the present invention may enable the user to dynamically change a metric as it is displayed in Variables view 1220. As execution proceeds through the steps related to an inbound event, an embodiment of the present invention may visually highlight the declarative element within work area 1240 in addition to the visual highlighting of the sequential step in window 1230.

The Debug view 1210 displays the monitoring context instances that have been correlated with the inbound event, as noted earlier. This view 1210 preferably also contains the controls that the user interacts with to debug the monitor model, such as icons associated with a "Step" action, a "Resume" action, etc. These debug controls preferably function similarly to the debug controls commonly used with debuggers (for example, allowing the user to skip debugging of the remaining steps of the current <onEvent> statement, to suspend single-step mode and resume normal execution, and so forth).

As one alternative to using the cross-reference file for associating steps in window 1230 with an element in work area 1240, the cross-reference file might be presented to the user outside the context of (i.e., separate from) the debugger.

As the monitor model is executing in debug mode, data may be written to a run-time database or log so that a dashboard may be used to inspect the resulting values.

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. In a preferred embodiment, the invention is implemented in software, which includes (but is not limited to) firmware, resident software, microcode, etc. In a hardware embodiment, specialized or dedicated circuitry may be provided that carries out functions described herein. Furthermore, the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Figure 13:
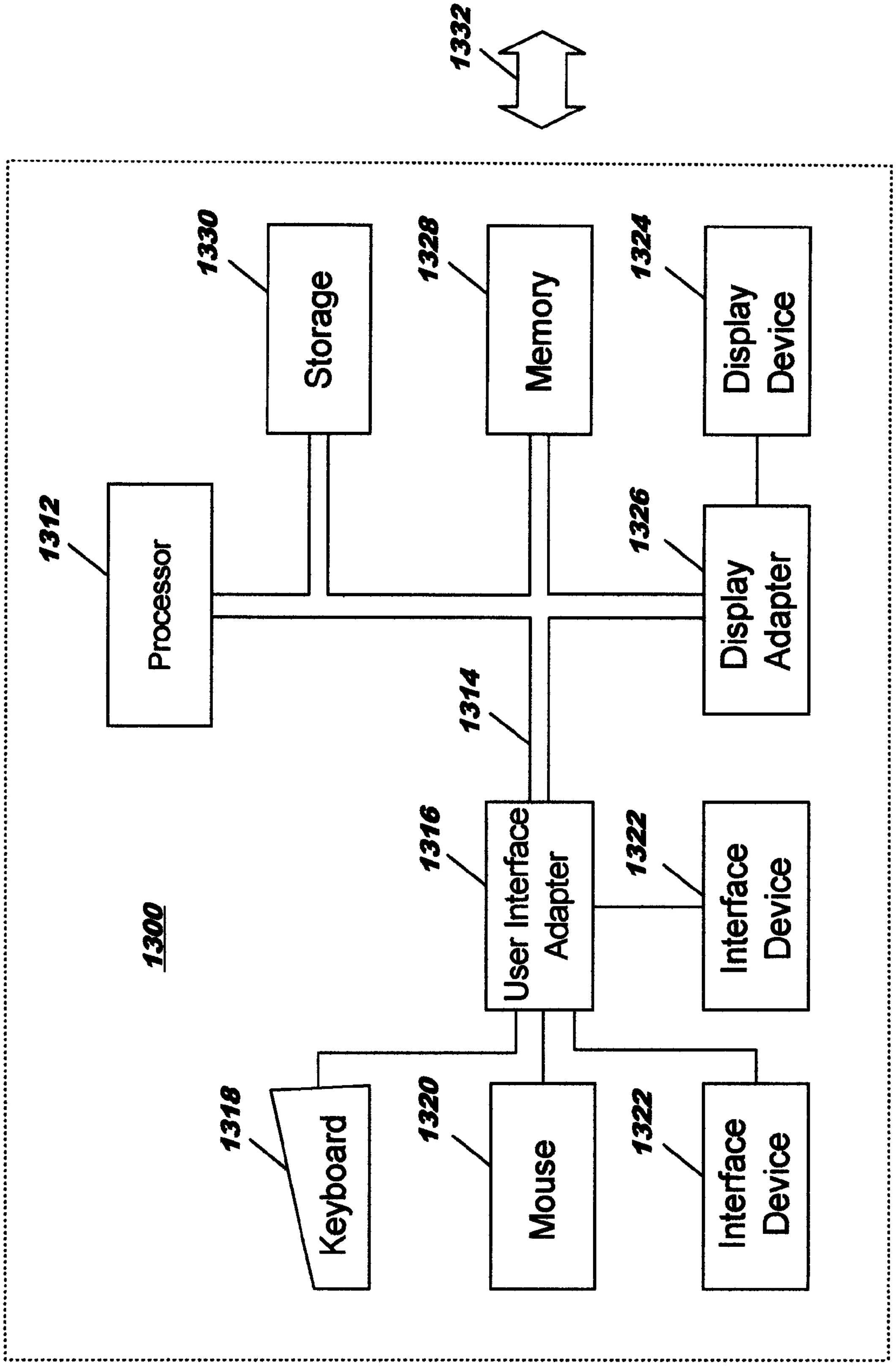
FIG. 13 depicts a data processing system suitable for storing and/or executing program code.

Referring now to FIG. 13, a data processing system 1300 suitable for storing and/or executing program code includes at least one processor 1312 coupled directly or indirectly to memory elements through a system bus 1314. The memory elements can include local memory 1328 employed during actual execution of the program code, bulk storage 1330, and cache memories (not shown) which provide temporary storage of at least some program code in order to reduce the number of times code must be retrieved from bulk storage during execution.

Input/output ("I/O") devices (including but not limited to keyboards 1318, displays 1324, pointing devices 1320, other interface devices 1322, etc.) can be coupled to the system either directly or through intervening I/O controllers or adapters (1316, 1326).

Network adapters may also be coupled to the system to enable the data processing system to become coupled to other data processing systems or remote printers or storage devices through intervening private or public networks (as shown generally at 1332). Modems, cable modem attachments, wireless adapters, and Ethernet cards are just a few of the currently-available types of network adapters.

Figure 14:
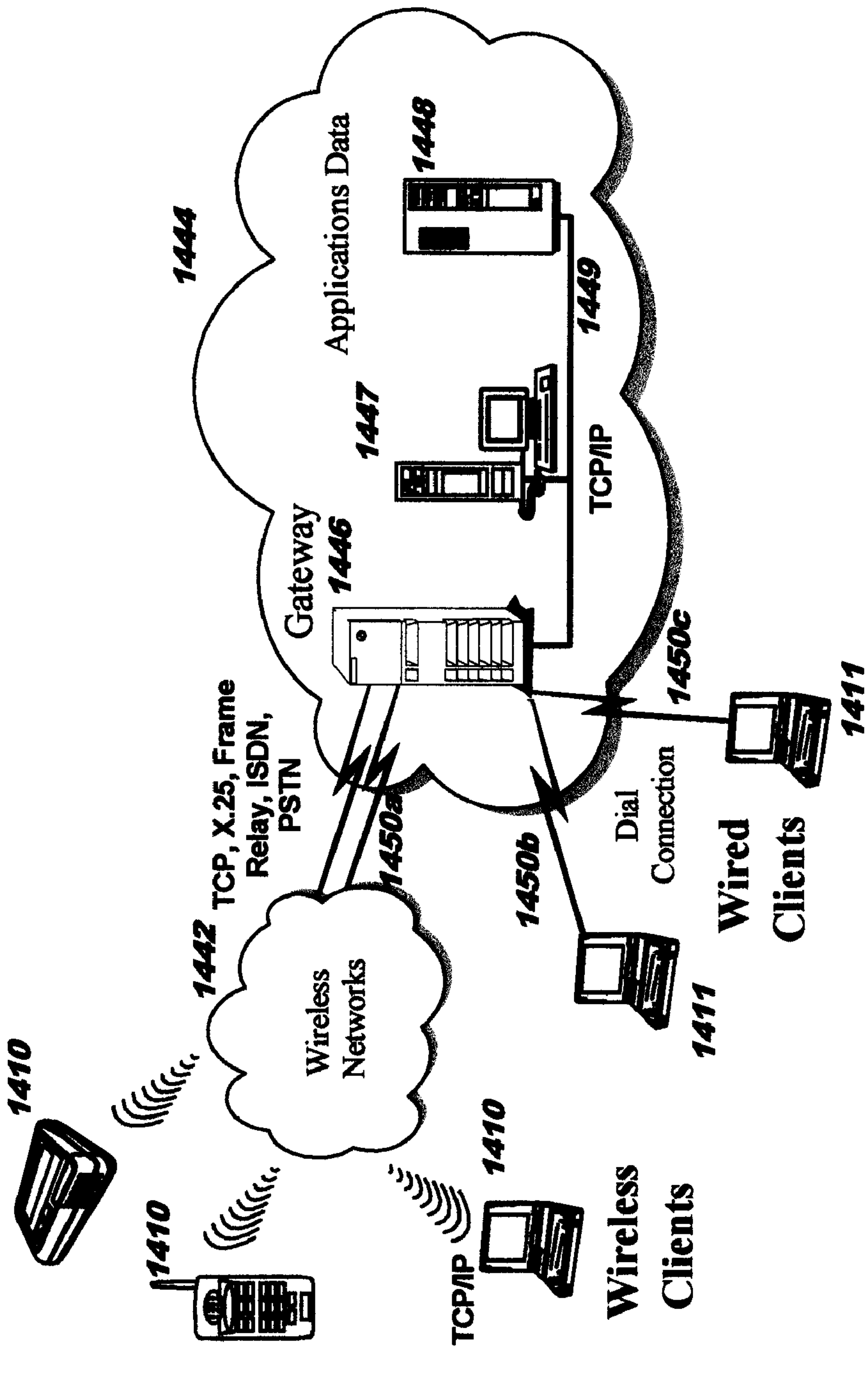
FIG. 14 depicts a representative networking environment in which one or more embodiments of the present invention may be used.

FIG. 14 illustrates a data processing network environment 1400 in which the present invention may be practiced. The data processing network 1400 may include a plurality of individual networks, such as wireless network 1442 and network 1444. A plurality of wireless devices 1410 may communicate over wireless network 1442, and a plurality of wired devices, shown in the figure (by way of illustration) as workstations 1411, may communicate over network 1444. Additionally, as those skilled in the art will appreciate, one or more local area networks ("LANs") may be included (not shown), where a LAN may comprise a plurality of devices coupled to a host processor.

Still referring to FIG. 14, the networks 1442 and 1444 may also include mainframe computers or servers, such as a gateway computer 1446 or application server 1447 (which may access a data repository 1448). A gateway computer 1446 serves as a point of entry into each network, such as network 1444. The gateway 1446 may be preferably coupled to another network 1442 by means of a communications link 1450*a*. The gateway 1446 may also be directly coupled to one or more workstations 1411 using a communications link 1450*b*, 1450*c*, and/or may be indirectly coupled to such devices. The gateway computer 1446 may be implemented utilizing an Enterprise Systems Architecture/390® computer available from IBM. Depending on the application, a midrange computer, such as an Application System/400® (also known as an AS/400®), iSeries®, System i™, and so forth may be employed. ("Enterprise Systems Architecture/390", "Application System/400", "AS/400", and "iSeries" are registered trademarks of IBM in the United States, other countries, or both, and "System i" is a trademark of IBM.)

The gateway computer 1446 may also be coupled 1449 to a storage device (such as data repository 1448).

Those skilled in the art will appreciate that the gateway computer 1446 may be located a great geographic distance from the network 1442, and similarly, the wireless devices 1410 and/or workstations 1411 may be located some distance from the networks 1442 and 1444, respectively. For example, the network 1442 may be located in California, while the gateway 1446 may be located in Texas, and one or more of the workstations 1411 may be located in Florida. The wireless devices 1410 may connect to the wireless network 1442 using a networking protocol such as the Transmission Control Protocol/Internet Protocol ("TCP/IP") over a number of alternative connection media, such as cellular phone, radio frequency networks, satellite networks, etc. The wireless network 1442 preferably connects to the gateway 1446 using a network connection 1450*a* such as TCP or User Datagram Protocol ("UDP") over IP, X.25, Frame Relay, Integrated Services Digital Network ("ISDN"), Public Switched Telephone Network ("PSTN"), etc. The workstations 1411 may connect directly to the gateway 1446 using dial connections 1450*b* or 1450*c*. Further, the wireless network 1442 and network 1444 may connect to one or more other networks (not shown), in an analogous manner to that depicted in FIG. 14.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A method of debugging a declarative event-driven model specification, comprising:

stepping through, in a debugger, execution of a compiled program generated from the declarative event-driven model specification and comprising a sequence of execution steps for execution on a computer;

accessing, by the debugger during the stepping through, cross-references created during the generating of the compiled program to relate each of the execution steps of the compiled program to a corresponding element of the declarative event-driven model specification from which the execution step was generated; and iteratively performing, for each of the execution steps executed during the stepping through:

communicating, by the debugger with a run-time environment that is executing the compiled program, to obtain an identification of the executed execution step;

using the accessed cross-references, by the debugger, to identify a particular one of the elements from the declarative event-driven model specification that corresponds to the identified execution step; and visually highlighting, on a user interface, a visual representation of the identified particular one of the elements and a visual representation of the identified execution step.

2. The method according to claim 1, wherein the declarative event-driven model specification defines an observer object and specifies how to update a state of the observer object based on occurrence of events reporting state changes.

3. The method according to claim 1, wherein the declarative event-driven model specification defines a monitoring context for a monitored entity and specifies how to update a state of the monitoring context based on occurrence of events reporting state changes of the monitored entity.

4. The method according to claim 3, further comprising creating at least one instance of the monitoring context to provide an execution context for executing the compiled program.

5. The method according to claim 1, wherein the stepping through further comprises receiving, by the debugger, a selection of a test event and communicating with the run-time environment to notify the run-time environment to process the selected test event according to at least one of the execution steps that corresponds to the selected test event.

6. The method according to claim 5, wherein the notification to process the selected test event is sent to an address of the run-time environment.

7. The method according to claim 5, wherein the notification to process the selected test event is published to a publish-subscribe infrastructure and subscribed to by the run-time environment.

8. A system for debugging a declarative event-driven model specification, comprising:

a computer comprising a processor; and instructions executable using the processor to perform functions of:

stepping through, in a debugger, execution of a compiled program generated from the declarative event-driven model specification and comprising a sequence of execution steps for execution on a computer;

accessing, by the debugger during the stepping through, cross-references created during the generating of the compiled program to relate each of the execution steps of the compiled program to a corresponding element of the declarative event-driven model specification from which the execution step was generated; and iteratively performing, for each of the execution steps executing during the stepping through:

communicating, by the debugger with a run-time environment that is executing the compiled program, to obtain an identification of the executed execution step;

using the accessed cross-references, by the debugger, to identify a particular one of the elements from the declarative event-driven model specification that corresponds to the identified execution step; and visually highlighting, on a user interface, a visual representation of the identified particular one of the elements and a visual representation of the identified execution step.

9. The system according to claim 8, wherein the stepping through further comprises receiving, by the debugger, a selection of a test event and communicating with the run-time environment to notify the run-time environment to process the selected test event according to at least one of the execution steps that was generated to represent logic of a subscription to the selected test event in the declarative event-driven model.

10. The system according to claim 9, wherein the notification to process the selected test event is sent to an address of the run-time environment or is published to a publish-subscribe infrastructure and subscribed to by the run-time environment.

11. A computer program product for debugging a declarative event-driven model specification, the computer program product embodied on at least one non-transitory computer-usable medium and comprising computer-usable program code for:

stepping through, in a debugger, execution of a compiled program generated from the declarative event-driven model specification and comprising a sequence of linear execution steps for execution on a computer to carry out event processing specified in the declarative event-driven model specification;

accessing, by the debugger during the stepping through, cross-references created during the generating of the compiled program to relate each of the execution steps of the compiled program to a corresponding element of the declarative event-driven model specification from which the execution step was generated; and iteratively performing, for each of the execution steps executing during the stepping through:

communicating, by the debugger with a run-time environment that is executing the compiled program, to obtain an identification of the executed execution step;

using the accessed cross-references, by the debugger, to identify a particular one of the elements from the declarative event-driven model specification that corresponds to the identified execution step; and visually highlighting, on a user interface, a visual representation of the identified particular one of the elements and a visual representation of the identified execution step.

12. The computer program product according to claim 11, wherein:

the stepping through further comprises receiving, by the debugger, a selection of a test event and communicating with the run-time environment to notify the run-time environment to process the selected test event according to at least one of the execution steps that corresponds to receiving the test event; and the notification to process the selected test event is sent to an address of the run-time environment or is published to a publish-subscribe infrastructure and subscribed to by the run-time environment.

* * * * *